United States Patent [19]

Gardner, Jr.

[11] Patent Number: 4,753,078

[45] Date of Patent: Jun. 28, 1988

[54] ELECTROHYDRAULIC VEHICLE DRIVE SYSTEM

[76] Inventor: Elmer W. Gardner, Jr., 3359 Alexis Rd., Cincinnati, Ohio 45239

[21] Appl. No.: 850,996

[22] Filed: Apr. 10, 1986

Related U.S. Application Data

[63] Continuation-in-part of Ser. No. 659,612, Oct. 10, 1984, abandoned.

[51] Int. Cl.⁴ ............................................. F01K 15/00
[52] U.S. Cl. ..................................... 60/668; 60/698; 180/305; 290/1 R
[58] Field of Search ................. 60/668, 698; 180/165, 180/305; 290/1 R

[56] References Cited

U.S. PATENT DOCUMENTS

| | | | |
|---|---|---|---|
| 3,980,152 | 9/1976 | Manor | 180/66 B |
| 4,245,843 | 3/1981 | Han et al. | 180/165 |
| 4,413,698 | 11/1983 | Conrad et al. | 180/305 |

*Primary Examiner*—Stephen F. Husar

[57] ABSTRACT

An electrohydraulic vehicle drive system having a battery as the primary source of power being electrically connected to an electric motor that is mechanically connected to a multistage pump for pressurizing fluid according to the torque and horsepower requirement of the vehicle in which the pressurized fluid is fed to a standard hydraulic cylinder having piston rods reciprocatably connected to each end of a non rotatable worm screw gear having a right hand pitch at one end and a left hand pitch at the other end and arranged for reciprocatable engagement on each end to a rectangular gear fixed to the center of the clutch plate connected to a rotatable clutch disc for imparting rotation to a flywheel fixed to each end of a hollow output shaft to which the worm screw reciprocates therethrough in rotating the output shaft that is operatively connected to a clutch operative jackshaft connected to each side of an axle having a bearing to its center with the axles fixed at each end to a rotatable wheel of a vehicle. Provision is made for the recovery of electricity from electromagnetic wind generators, gyrogenerators, and gravitational generators, and for the recovery of compressed air from air pumps positioned vertically between the axle and the chassis of the vehicle replacing the standard shock absorbers. Auxiliary power is provided by a steam generator and compressed air for driving an alternator for generating electricity or alternatively for operating the drive cylinder. An intensifier boosts the pressure to the cylinder.

3 Claims, 13 Drawing Sheets

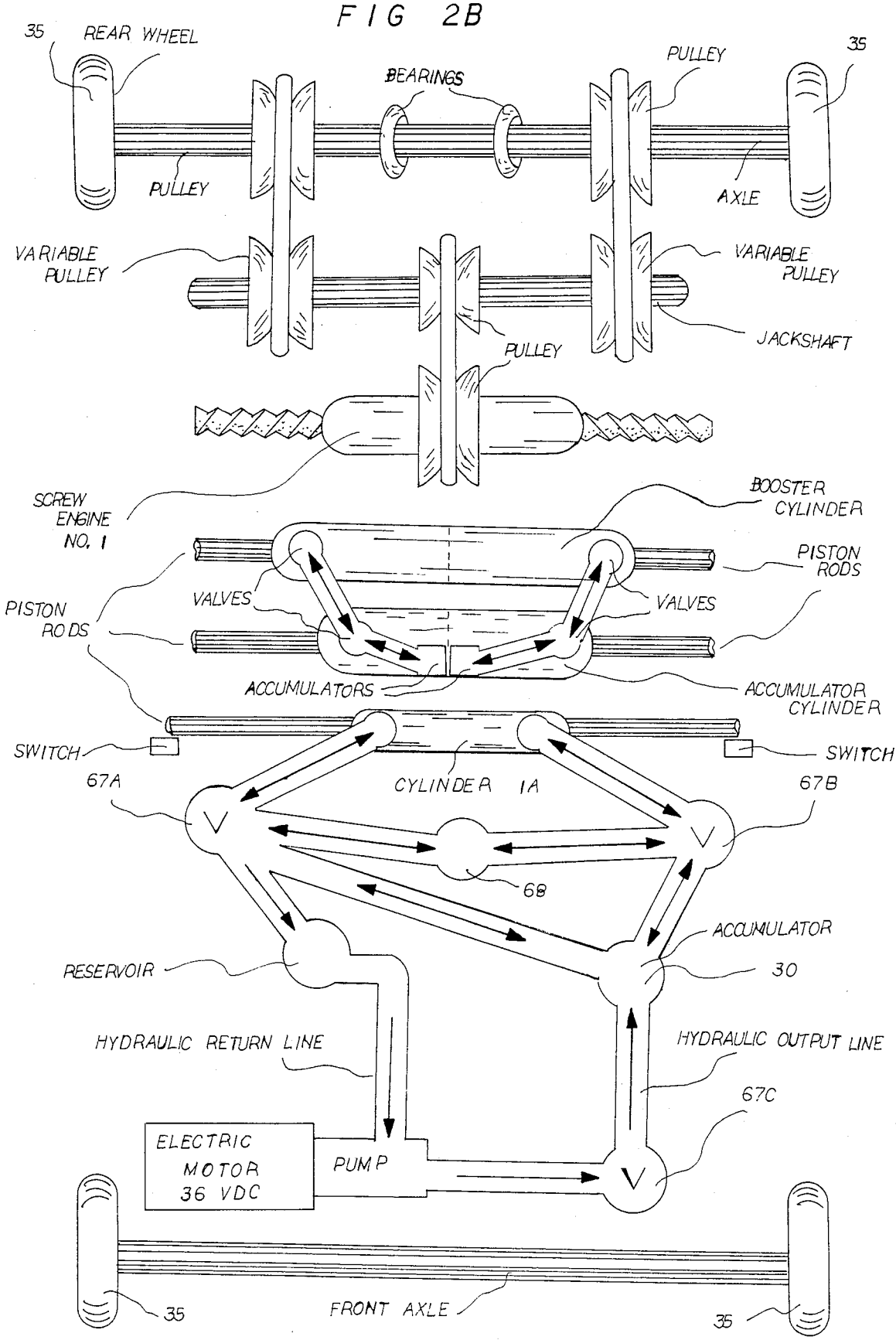

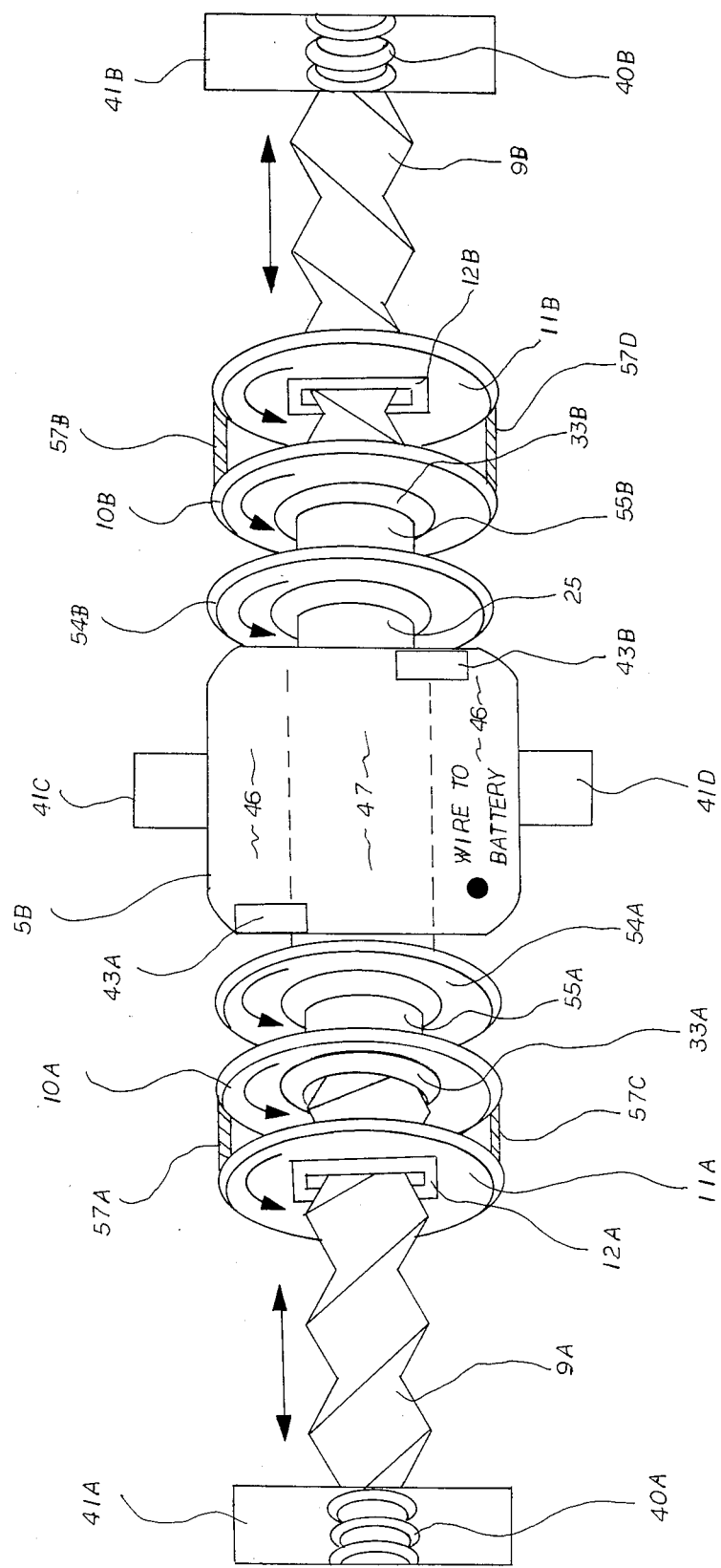

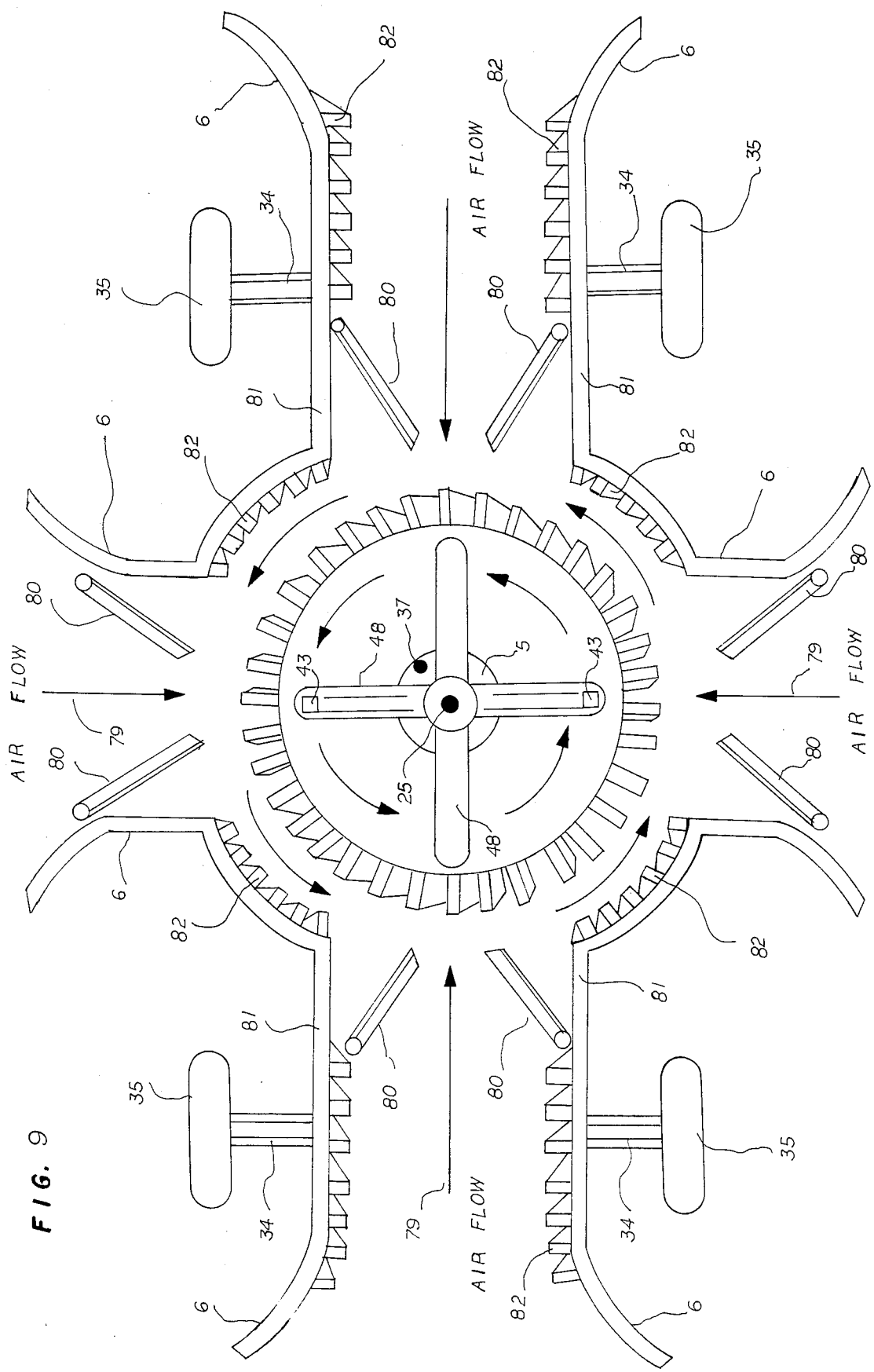

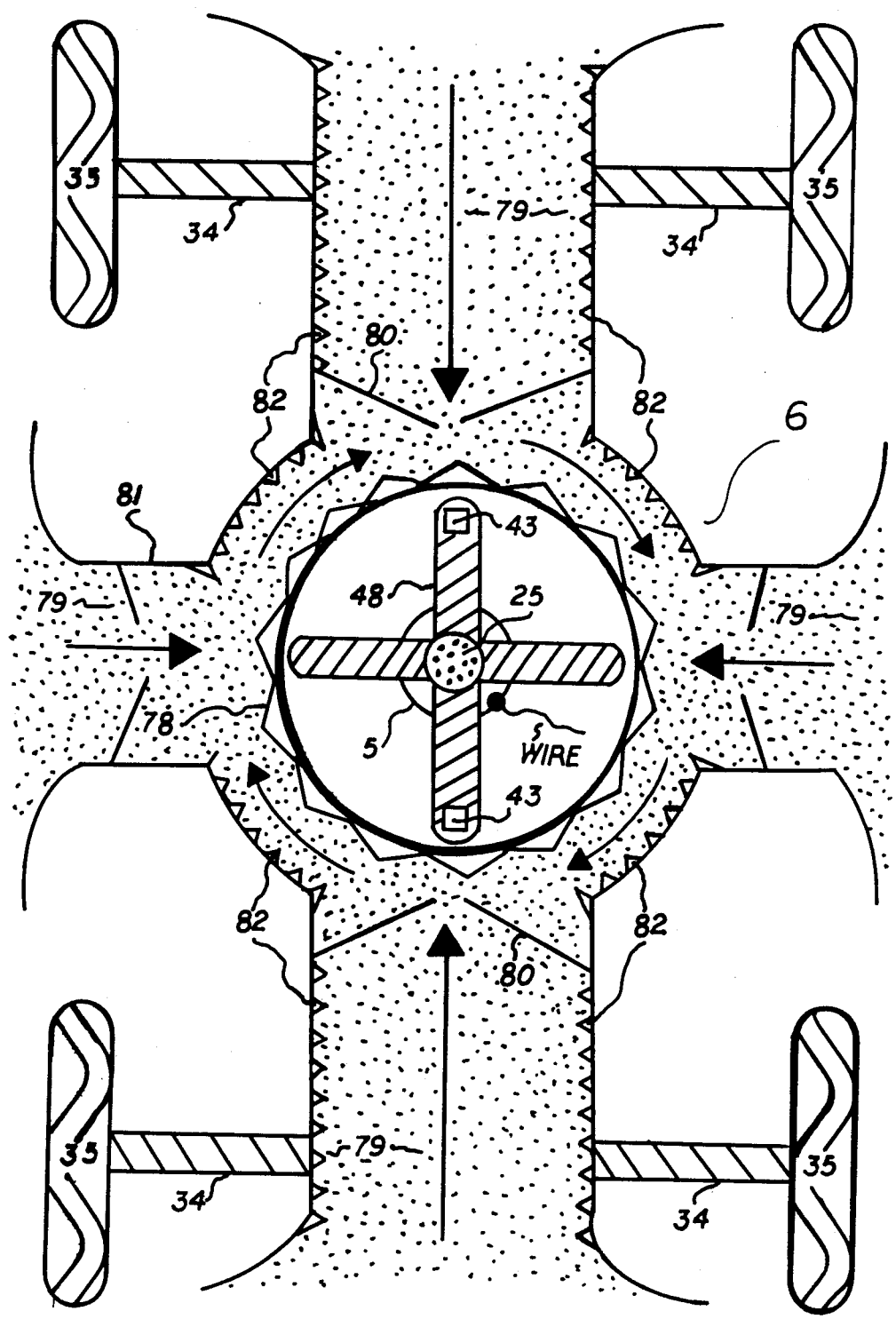

ELECTROHYDRAULIC VEHICLE DRIVE SYSTEM

This application is a continuation-in-part of Ser. No. 06/659,612, filed 10/10/84, now abandoned.

TECHNICAL FIELD

This invention relates to a regenerative vehicle drive system that is either pneumatically or hydraulically controlled and has electricity as its power source.

BACKGROUND OF THE PRIOR ART

A thorough search was conducted covering all aspects of previous vehicular drive systems as indicated in the previous U.S. Patent documents and no similar device was found as outlined in this patent application. Prior art has disclosed a number of vehicle drive systems using wind generators in combination with electric motor driven vehicles, quite a number of vehicle drive systems having gasoline engines for driving a generator or alternator for supplying electricity to an electric driven vehicle and also the opposite whereby an electric motor is the auxiliary power to a gasoline driven vehicle, a number of energy storage devices as flywheels in combination with the gasoline engine and also several hydraulically driven vehicles having electricity as the power source. Conrad U.S. Pat. No. 4,413,698 there is disclosed a hydraulically motor driven vehicle that is battery controlled, has a hydrostatic transmission and a hydraulically driven generator for the recharging of batteries. The Gilbert U.S. Pat. No. 3,948,047 relates to a turbine wheel of improved design having a hydralic pump as a source of power that is driven by an electric motor or gasoline engine and the output of the pump is connected across a sequencing valve to a rotor or a power wheel unit. U.S. Pat. No. 3,379,008 shows the turbine having a vane rotor within its shaft connected to a transmission and responsive to compressed air to propel a vehicle. U.S. Pat. No. 2,468,828, Kopp, shows the use of a turbine type hydraulic motor in a vehicle drive system. U.S. Pat. No. 3,456,520 describes a hydraulic drive in which a hydraulic motor drives the vehicle and also serves as a pump during braking. U.S. Pat. No. 3,734,225 discloses an improvement in an hydrostatic drive system by the adjustment of the control means by regulating the pressure so that the hydraulic motor operates as a constant motor. The hydraulic motor drives have been driven either by an electric motor to a pump or by a gasoline engine and in several of the disclosures the hydraulic drive system serves as auxiliary power to the gasoline engine driven vehicle.

In the Spahn U.S. Pat. No. 3,556,239 discloses a battery powered vehicle having air operated turbines for providing charging current to batteries and for driving the vehicle. Horvat U.S. Pat. No. 4,002,218 discloses a series of flat rotary vanes operated by fluid currents that generate electricity through sensing switching controls to a storage battery for providing electricity to an electric motor for driving the vehicle. In U.S. Pat. No. 4,254,843, Han, discloses the application of a whirl ventilator system using air flow and vehicle momentum to a clutch mechanism at the drive shaft for driving an electrical generator in the recharging of batteries for supplying electricity for driving an electric motor to the vehicle and also an on-board fuel powered engine for driving an electrical generator. In the Horwinski U.S. Pat. No. 3,904,883 it is disclosed a hybrid energy converter and transmission unit wherein one and the same electrical machine is used as the driving motor and also as the generator for recharging the batteries in an electrical driven vehicle. This required high starting currents. In U.S. Pat. No. 4,042,056 Horwinski also disclosed a hybrid vehicle power system involving both an electric motor and an internal combustion engine, wherein excessively and abnormally high starting currents are eliminated by using a simplified power transmission having an exceptionally high speed ratio and range, and one set of wheels is powered by the internal combustion engine and the other set of wheels is powered by an electric motor. The drive comprises a combination to a magnetic clutch with chain drive to the front and the rear to sets of cone pulleys connected by a chain drive to the motor. In U.S. Pat. No. 2,974,769 there is disclosed a vehicle transmission in which mechanical energy obtained from an internal combustion engine is connected through a magnetic particle clutch to a gear box which is coupled to the drive shaft of a vehicle. In U.S. Pat. No. 3,845,835 there is discloed an electric power plant for a land vehicle which includes an electric motor, for turning the drive shaft of the vehicle, two alternators also driven by the motor, a voltage regulator for the alternators and two sets of batteries charged alternately through the regulator. The battery not being charged energizes the motor. The alternators are connected to the axles of the vehicle. In U.S. Pat. No. 3,077,121 shows an automatic transmission control system which includes a plurality of magnetic particle clutches. And other examples of transmission mechanisms employing magnetic partical clutches includes U.S. Pat. No. 2,688,388 and U.S. Pat. No. 2,718,157. In U.S. Pat. No. 3,917,017 discloses a battery operated vehicle drive system in which two sets of series connected batteries are alternately charged by an internal combustion engine under control of a change over selector. The vehicle speed is controlled by selection of power terminals, at different voltage levels, from which the drive motor is energized. In U.S. Pat. No. 3,367,438 is described a power plant for a vehicle in which an internal combustion engine and an electric motor are used alternatively for powering the vehicle.

In U.S. Pat. No. 4,095,664, Bray, discloses an arrangement in which a constant speed AC motor is energized through an A.C. alternator which is driven primarily by a battery powered 12 VDC motor which also drives three DC rectified alternators used for providing energy to recharge batteries and energize the magnetic clutch that is coupled to the output shaft of the AC motor, and a small gas motor is detachably connected to the alternators in parallel with the DC motor and operates only when power in the batteries becomes lower than a perdetermined level. The vehicle is primarily powered by the electric motor AC the the particle clutch producing a variable speed to the drive shaft of the vehicle and in certain instances the vehicle is powered by the gasoline engine.

In U.S. Pat. Nos. 4,042,054 and 4,042,055 Ward is disclosed means for providing a lighter frame requirement and reduced battery load and also a chain drive is associated with each drive wheel and the vehicle has a non rotating axle, is electrically driven by a DC electric motor and has a battery pack that can easily be removed from the vehicle.

In U.S. Pat. No. 3,575,250 Dykes is disclosed an electric driven vehicle with each wheel having its own motor that are series connected at one setting and parallel connected at another, and in turning, one of the motors will load and slow down and the other will speed up in a differential action.

In U.S. Pat. No. 3,190,387 Dow is disclosed a four wheeled vehicle having two drive wheels each provided with its own motor carried on the vehicle frame which is sprung up on the wheels.

In U.S. Pat. No. 3,878,913 Lionts is disclosed a weighted flywheel operatively connedted to a fan and through reduction gearing to a generator shaft and to a freewheeling type of clutch overdrive for charging batteries for driving an electrically powered vehicle.

In U.S. Pat. No. 3,734,222 Bardwick III is disclosed an inertial energy flywheel system which includes clutch means for introducing energy to the flywheel from an engine or from a coasting or decelerating vehicle and clutch means for transferring the stored energy to the vehicle on demand.

In U.S. Pat. No. 3,882,950 Strohlein is disclosed a means for withdrawing surplus power from the primary source of power to a vehicle and storing it in a flywheel operatively connected to the drive train of a vehicle at selected times and to use this energy to drive the vehicle.

U.S. Pat. No. 2,941,613 and 3,444,946 shows having a clutch and flywheel governed transmission of generator driving power from a rotary fan with an intake air scoop and fan housing.

U.S. Pat. No. 3,621,929 Oberthur shows regenerative braking in which an electric motor operating as a generator to the rear axles of a vehicle with the hydraulic braking system not taking effect until the electric motor braking has reached its maximum value.

U.S. Pat. No. 4,277,737 Werth shows a method and means for utilizing rechargeable batteries in the operation of electric vehicles by recharging one or more battery blocks, each consisting of several batteries, by generators driven by braking energy, solar-cell arrays, or a power supply drawing rectified and stabilized current from a utility network.

U.S. Pat. No. 4,348,628 Loucks shows an electric driven vehicle having an electric motor operated by two alternating power circuits, each having a battery with a circuit for an open and closed mode of operation that permits the electric motor to be operated by one battery while the other battery is being recharged.

U.S. Pat. No. 4,533,011 Heidemeyer and Zantopp shows a hybrid drive for an electric vehicle having an electric motor being connected with a driving axle of the vehicle by means of a first disconnecting clutch and with an internal combustion engine arranged in series therewith by means of a second disconnecting clutch wherein the internal combustion engine is designed without a flywheel and the flywheel mass required for its operation is an integral component of the rotating masses of the drive between the disconnection points of the two disconnecting clutches.

U.S. Pat. No. 4,227,587 Carman shows an automotive drive system in which an hydraulic pump is mechanically coupled to the wheels of a vehicle for pumping fluid under pressure to an accumulator for transmission to an hydraulic motor mechanically coupled to the engine for driving said engine, including speed responsive means for stopping the flow of hydraulic fluid from said accumulator to said motor when the engine has reached a predetermined speed.

U.S. Pat. No. 4,532,769 Vestermark shows an energy storing flywheel assembly comprising two hubs having first and second reels with the second hub being larger than the first with a coiled ribbon extending between the first and second hub and a clutch control mechanism for transmitting rotational power from a power input to a power output shaft.

U.S. Pat. No. 4,383,589 Fox shows a pneumatic vehicle drive system in which each wheel is provided with a motor driven by compressed air from a storage tank and the rotation of each wheel is also utilized for driving air compressors in compressing air for storage.

U.S. Pat. No. 4,163,367 Yeh shows a hybrid flywheel/compressed fluid propulsion system for vehicle drive comprising a compressed fluid powered turbine in conjunction with the use of a flywheel in which the turbine serves as a compressor expander for driving an output shaft and for recovering kinetic energy during braking and deceleration and the flywheel is used for recovering kinetic energy and for driving an output shaft and an AC alternator and the flywheel/motor/alternator unit can be driven by an A.C. motor transmitting shaft power to the expander/compressor.

U.S. Pat. No. 4,290,268 Lowther shows an auxiliary kinetic energy recovery system for a vehicle with a rotary sliding vane engine including a compressor, a combustion chamber and a motor in which the braking is done by connecting the rotor of the compressor to a wheel and braking rotation of the rotor by controlling the gas flow through the rotary sliding vane compressor.

U.S. Pat. No. 4,590,767 Gardner, Jr. shows an auxiliary power drive system, including kinetic energy recovery, coupled to an internal combustion engine in which by passed exhaust gas is fed to a rotary vane for driving an output shaft and also for compressing air and an electrohydraulic motor as auxiliary power to the internal combustion engine, including the recovery of kinetic energy by the application of alternators, hydraulic pumps and compressors to the drive shaft and wheels of the vehicle.

The greatest problem experienced with the electric and hydraulic driven vehicle is the need for greater efficiency, for hydraulic motors and electric motors are most efficient at constant speed which presents considerable difficulty in a variable speed drive system as evidenced in vehicular drive. With the electric vehicle, high starting torque is necessary which requires a high starting current that causes a high internal voltage drop in batteries. Amperage hour capacity goes down drastically with high current draw and also the life of the battery. And as shown in the prior art, whether electric motors are adapted to the drive wheels or to the drive shaft, it is necessary to gear down the electric motor as it functions best at high RPM. Torque is difficult to control with the electric motor and also the hydraulic motor.

The electrohydraulic vehicle drive system offers an advantage and in U.S. Pat. No. 4,413,698 Conrad shows a method for providing a constant speed electric motor to a hydraulic drive system in which the fluid flow to the hydraulic motors is controlled by a system of valves which also control the speed of the vehicle. This has eliminated the need for a high starting torque to the electric motor and with a reduction in the overall size of the batteries needed, however, the hydraulic motors require a constant high pressure flow of fluid at all times in order to be operational and this causes inefficiency.

The prior art does not disclose one system that is efficient enough and has the provision for providing the total energy source for driving a vehicle over long range without the need for down time and the recharging of batteries or the need for an external supply of fuel in a manner similar to the gasoline or diesel engine.

For any vehicle to replace or serve as a substitute to the internal combustion engine, its efficiency must be at the maximum and with the capability for regenerating a high percentage if not all of the energy needed for driving the vehicle under all road conditions.

In the prior art U.S. Pat. No. 4,413,698 in which Inventor Conrad has succeeded in regenerating a high percentage of energy by the application of an electric motor connected to a pump for driving an alternator, however the hydraulic motor that drives the alternator lacks the efficiency needed for generating a higher percentage of electricity.

The variable and exceedingly high energy demands for driving vehicles has not been met with a complete and comprehensive regenerative system and has fallen short of providing competitive performance characteristics of that experienced with the internal combustion engine; so no hybrid vehicular drive system has proven to be wholly suitable, adaptable and totally acceptable as an alternative power source for driving non-stationary vehicles, mainly because it relies too heavily upon external means for supplying the energy necessary for operating such a system.

BRIEF SUMMARY OF THE INVENTION

This invention comprises a battery powered hydraulically operated vehicle drive system in which electricity is transmitted to an electric motor for driving a pump in pressurizing hydraulic fluid for powering a standard hydraulic cylinder having either a single or a double rod piston that is operatively connected to a worm screw drive with an output shaft for driving variable pulleys at a jackshaft that is connected by belt and pulley to the drive axles of a vehicle.

The jackshaft is adapted with an electric clutch mechanism that is wired to an accelerator switch and is automatically engaged for driving the vehicle when the accelerator lever to the vehicle is pressed and is automatically disengaged when the accelerator lever is released. When the clutches to the jackshaft are disengaged, a series of compressors are connected to the axles that are operatively engaged for compressing air during braking and deceleration of the vehicle. The compressed air is fed to a storage tank.

Additional kinetic energy is recovered during vehicular movement by the application of a compressor operatively arranged between the axle and chassis/frame of a vehicle whereby the compressor is a pump having a piston with a double rod, one end of the first rod is connected to the axle housing and the one end of the second rod is connected to the chassis of the vehicle and the pump cylinder is fixed to the frame, causing the vertical movement of the vehicle to provide a pumping action to the cylinder. Also, a gravitational generator is arranged in the same manner as the pump compressor explained above and at each wheel of the vehicle. It comprises a generator or alternator having a hollow rotor shaft, the alternator being fixed to the vehicle frame and the non rotatable worm screw gear having a right hand screw pitch at one end and a left hand screw pitch at the other end with one end connected to the chassis and the other end connected to the axle housing, the up and down movement of the axle and housing driving the worm screw gear to a rectangular gear at each end of an alternator, the rectangular gear is connected to a clutch for making intermittent engagement to a small flywheel plate fixed to the rotor shaft that is rotated by the reciprocatable movement of the worm screw gear to the rectangular gear and clutch. Electricity that is generated is fed to a series of storage batteries, and when the vehicle is in motion there is constant generation of electricity and the compression of air that helps provide energy for driving the vehicle.

Because an electrical driven vehicle normally requires down time for the recharging of batteries, as considerable energy is expended during high speed driving, this invention provides for a means to recharge the batteries without down time by having on board the vehicle a small steam operated generator that provides pressurized steam to a small steam cylinder for driving a non rotatable worm screw gear having an output shaft operatively connected to an alternator for generating electricity. The steam generator can be operated by solar heat, chemicals, heating oil or fuel oil and is operator controlled through a select switching arrangement when the discharge rate in the batteries reaches a predetermined level. The alternator can also be operated by the compressed air that is recovered and stored in a tank and in the same manner as for operating the steam cylinder and alternator.

This invention is applicable to large size vehicles as with public transportation vehicles, including buses and trucks, which is not possible with the currently available electric vehicles or hydraulic driven vehicles. This is possible with this invention because air and hydraulic cylinders are manufactured in various lengths and bore sizes, usually varying from one inch bore diameter to almost unlimited diameter and length, thus giving the piston and rod considerable driving force and operating distance. And the advantage with this system is the ability to control the energy that is needed according to the weight and size of the vehicle and its top speed by regulating the flow of pressurized working fluid to the cylinder by a series of valves and accumulating excess fluid for storage in a pressure accumulator that can be used for driving the vehicle without using electrical energy for driving the electric motor and pump. The electric motor and accumulator can be operated alternately by the operator of the vehicle turning off and on the electric motor when volume and pressure in the accumulator is sufficient for driving the vehicle, and this is a predetermined factor that is formulated according to the payload, size and weight of the vehicle. For heavy city traffic driving where there is considerable stop and go driving would give the greatest accumulation of fluid, as the preferred embodiment is for the electric motor to run at a constant speed at its maximum efficiency and at the same time accumulate pressurized fluid that can be used for starting the vehicle and driving short distances. The electric motor nor the accumulator would be operable while the vehicle is not moving so no energy would be expended, and additionally the constant stop and go driving in inner city driving would give greater accumulation of kinetic energy in the form of electricity and compressed air.

The greatest expenditure of energy would be in high speed highway driving, and in order for the energy to be replaced without down time for the recharging of batteries, in addition to the steam generator for onboard generating of electricity and the gravitational generator and the pump compressor at the wheels, at least one wind generator that is electromagnetically operated is positioned to the chassis frame at the front of the vehicle for generating electricity, a turbine operated generator is positioned underneath the frame of the vehicle and to its center for generating electricity and a gyroscopic generator is also positioned to the center and frame of the vehicle for generating electricity. These generators are applicable only while the vehicle is moving at a speed of 15 or more miles per hour and are particularly adaptable during high speed operation. Depending upon the terrain and road conditions, for the greater the vehicular movement to the roadway kinetic energy recovery is increased with any type of vehicular movement. A very bumpy and uneven road could cause enough vehicular movement to the generators and pumps that the energy recovered could equal the energy expended, whereas a smooth roadway would cause a considerable reduction in the amount of kinetic energy recovered and it would be necessary to operate the steam generator or compressed air generator unit for providing continuing and on-going electricity to the series of storage batteries for driving the electric motor and pump.

For trucks and buses and vehicles requiring a high speed application, the arrangement is for the air or hydraulic drive cylinder to be connected to a pump-accumulator that has a separate fluid reservoir for supplying working fluid and that is driven by the drive cylinder for pressurizing fluid that in turn is fed to a high pressure booster cylinder having a piston and double rods that are connected to the non rotatable worm screw gear drive for driving an output shaft. The working fluid in the booster cylinder can also be further intensified by the application of compressed air that is fed from a storage tank. In this manner the pressure of the working fluid can be increased several thousand pounds. During normal vehicle operation when the working pressure requirement would be less, a clutch mechanism adapted to the piston rods between the first drive cylinder and the pump accumulator can be electrically controlled by the operator for selective disconnect and the first drive cylinder would have direct drive connection to the worm screw gear drive for driving the output shaft.

The worm gear drive is a positive drive and as it is reciprocated by the piston rods it imparts a rotary motion to a rectangular gear as it passes through its center, the rectangular gear is connected to a clutch that imparts this rotary motion to a flywheel fixed to each end of an output shaft. The advantage of the screw drive is the number of revolutions imparted to the rectangular gear for each foot of stroke of the piston inside the cylinder. The number of revolutions is determined by the screw pitch and the number of screw turns to the screw gear, and for each foot of stroke of the piston and screw gear the revolutions imparted to the output shaft can be considerably greater than with any other type of reciprocatable engine, including the crank and shaft as used in most internal combustion engines and also those engines having gears operable to an output shaft. Also, this method is very inexpensive to manufacture because no lathing or special machining is required having the need for close tolerances. Hardened steel or stainless steel can be used that gives a reduction in weight by reducing size of screw used and with an increase in strength of the material.

A series of electric solenoid valves automatically control the flow of working fluid to the cylinders, accumulators and a multistage pump. The multistage pump pressurizes fluid in stages according to the pressure and volume needed at the drive cylinder. A series of voltage regulators regulate the voltage transmitted from the wind generator, the gravitational generators, the gyroscopic generator and the turbine generator to the batteries and from the battery to the electrical switching circuity. A series of relays and potentiometers regulate and control the flow of electricity to the solenoid valves and switches.

A master control switch positioned to the operator's compartment of the vehicle is the main off and on control switch for the entire electrical circuitry, including operator control of the auxiliary power for operating the steam generator and the release and control of compressed air for driving an alternator for generating electricity.

Once the electrical system is turned on, the accelerator lever that is operated by the driver of the vehicle in the same manner as with the conventional vehicle, through a series of potentiometers having a variable electrical resistance, regulates the flow of electricity to relays, switches and valves for controlling and regulating the flow of working fluid to the cylinders and accumulators and also to the electric clutch mechanisms. The solenoid valves and clutch mechanisms operate at 24 VDC whereas the electric motor operates at 36 VDC, therefore the alternators and generators operate at 36 VDC.

Objects of the Invention (1) To provide for a non-polluting power drive system for either stationary or non-stationary application (2) To provide for a vibrationless power drive system having high torque at low speed and low torque at high speed (3) To provide for a highly self sustaining power drive system that is not completely dependent upon fossil fuel for its energy (4) To simplify the power drive system and reduce its maintenance and enhance its durability

DESCRIPTION OF THE DRAWINGS

FIG. 2B is illustrative hydraulic fluid drive system showing the electric motor, the pump and output lines to the screw engine and the return lines, the accumulators and booster cylinder in relationship to the screw drive, jackshaft and drive axles of a vehicle FIG. 4 is a drawing of a gravational generator in which the hollow rotor to an alternator serves as the output shaft to the stator in generating electricity, a screw gear reciprocatable therethrough having one end connected to the axle and the other end to the chassis of a vehicle and the alternator connected to the frame, the screw gear having a right hand pitch on one end and left hand pitch on the other end for engagement to a rectangular gear connected to clutches operatively arranged to a flywheel fixed to the rotor shaft for generating electricity during vehicular movement

FIG. 9 is illustrative of a turbine wind generator positioned to the center of the undercarriage of a vehicle and having a combination of turbine and wind blades for driving an output shaft adapted for driving and alternator in generating electricity, the wind turbine generator having air scoops at the front, rear and sides of the undercarriage in which the wind is circulated through reaction blades for increasing its velocity and in circulating air to the wind and turbine blades

BRIEF DESCRIPTION OF THE INVENTION

Figure 1:
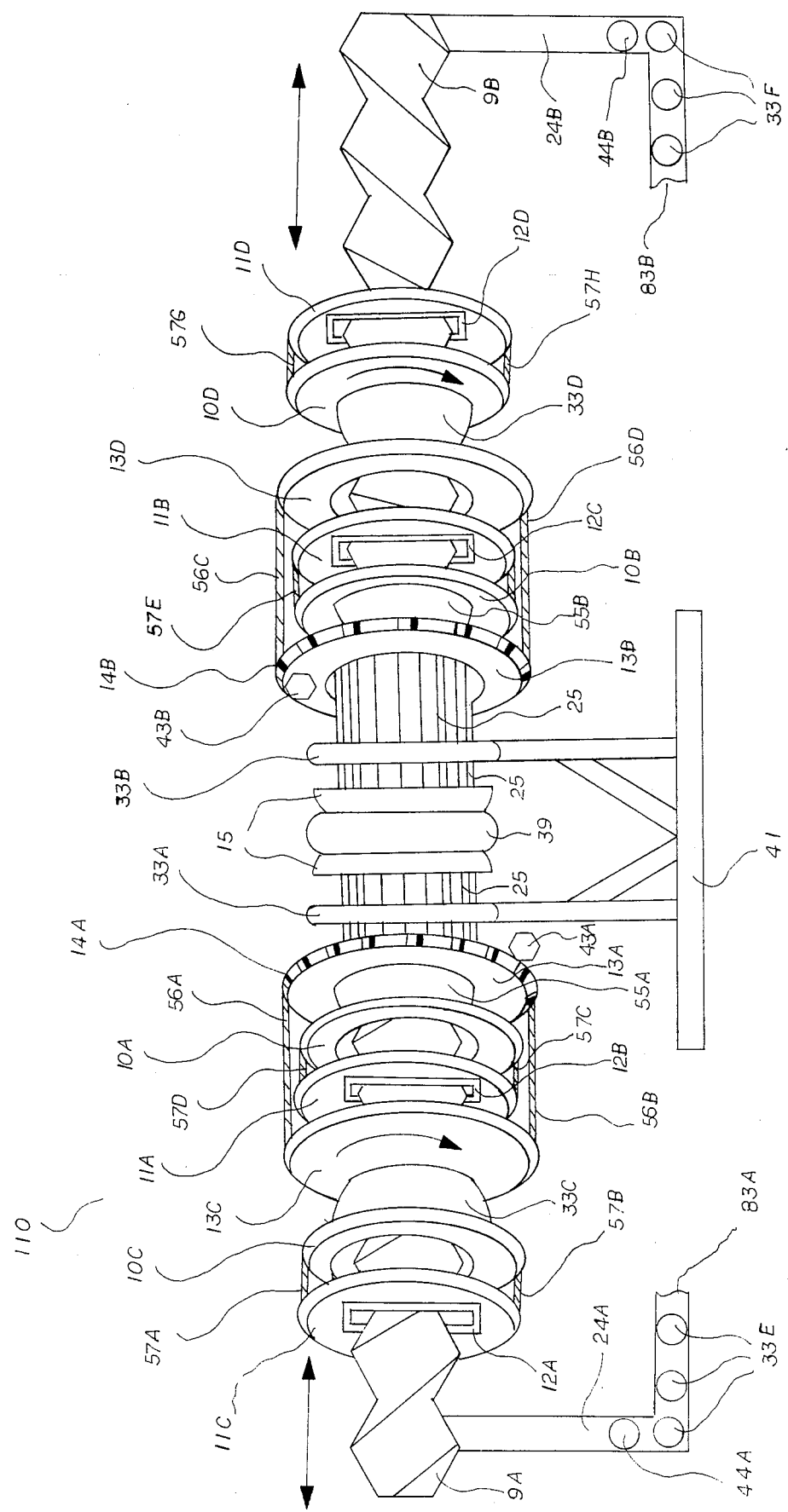
FIG. 1 is illustrative of a worm screw gear drive showing a non rotatable screw gear arranged for being driven rectinlearly and reciprocatably to dual rectangular gears fixed to dual clutches arranged for providing rotation to a flywheel fixed at each end of a hollow output shaft through which the screw gear reciprocates
Figure 2A:
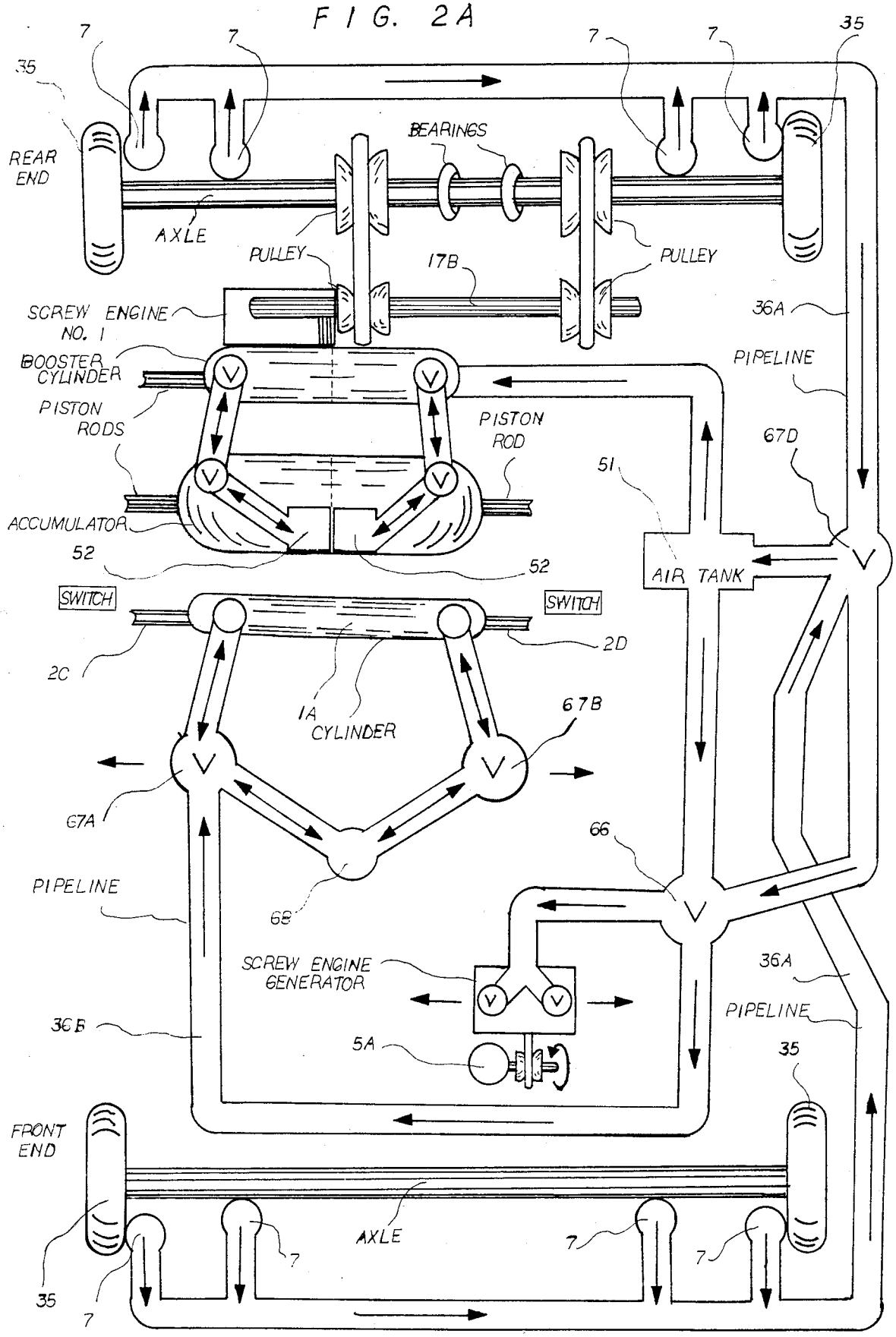
FIG. 2A is illustrative of the compressed air recovery system showing air compressors positioned at the axles and wheel area of a vehicle, the storage reservoir and pipelines leading to the auxiliary screw engine generator and to the drive cylinder and from the reservoir to the booster cylinder and also the jackshaft and variable pulley arrangement to the axles of the vehicle

FIG. 1, FIG. 2A and FIG. 2B, this invention pertains to a screw engine 110 that comprises either an air or hydraulic cylinder 1A preferably having a piston (not shown) with a double rod 2C and 2D that can withstand pressures of at least 3000 pounds per square inch or higher, although normally with most vehicles driving under 70 miles per hour the pressures would not exceed 1000 pounds per square inch.

Because present day highway driving requires a vehicle that has fast acceleration from a standstill and a cruising speed of at least 65 miles per hour over great distances and with the ability to carry at least four passengers, if an automobile, without the necessity for refueling for several hundred miles, the electric or hydraulically operated vehicle must meet these requirements.

The preferred embodiment for this invention is the application of pressurized hydraulic fluid because hydraulic fluid does not go "soft" under a heavy work load and it can also be highly pressurized with a small pump and low horsepower electric motor.

FIG.2B, is a drawing of the hydraulic system showing a 36 VDC electric motor that receives electricity from a battery source, connected to a hydraulic pump for pressurizing hydraulic fluid that is fed through a flow control valve 67C that is an electric solenoid valve that controls the direction of flow of pressurized fluid either to the accumulator 30 for accumulation or directly through pipelines to electric solenoid valve 67A. Depending upon the amount of fluid needed at cylinder 1A, either all of the pressurized fluid is transmitted through 3 way valve 67A to the cylinder and the remainder is transferred back to the accumulator 30 through the same pipeline as an overflow. (The electrical controls for the valves are fully explained in FIG. 2C). Valve 67B is also a three way electric solenoid valve and fluid flow is also directed through this valve from the accumulator 30 to cylinder 1A and excess fluid is directed back to the accumulator 30. However, the preferred embodiment for this invention is for the fluid first to be directed to the accumulator 30 after leaving valve 67C and in this manner all pressurized fluid would be transmitted from the accumulator, however, when the accumulator 30 is overloaded and full of pressurized fluid then the electric motor would be turned off, otherwise the pressurized fluid would bypass the accumulator 30. At high speeds both the accumulative fluid and fluid from the pump would we utilized for loading cylinder 1A.

FIG. 1, having a screw gear 9A and 9B that is one continuous gear that is driven reciprocatably and rectilinearly by the control arm 24A and 24B that slides in a rail 83A and 83B as it rides on bearings 33E and 33F and that is connected by a swivel element 44A and 44B to FIG. 2A and FIG. 2B piston rods 2C and 2D, is a method for one hydraulic cylinder for providing enough force to drive either a small or large vehicle at practically any speed comparable to the internal cmbustion engine, as screw pitch can vary at each end of the screw FIG. 1, having a right hand screw pitch at one end and a left hand screw pitch at the other end with the reciprocation giving one continuous direction of rotary motion for engagement to a rectangular gear 12A, 12B, 12C and 12D.

FIG. 1, the rectangular gears 12A,12B,12C, and 12D are dual gears and comprise a metal plate with a rectangular opening to its center that is proportionate to the rectangular shape of the worm screw gear, and it also can be a square opening for the same proportionately sized gear. The screw gear 9A and 9B gives high revolutions per minute for each foot of stroke to the piston in the cylinder 1A, and a screw can give 9 revolutions to the output shaft 25 for each foot of stroke in driving a medium size vehicle and, depending upon the diameter of the screw 9A and 9B, a small diameter screw could give more revolutions per minute than a large diameter screw and by using hardened steel or stainless steel the screw could be smaller but have greater strength than standard steel metal. The longer the screw and the longer the piston rod the greater the efficiency of the screw engine, because short strokes require greater energy during the reverse stroke and a push stroke would give more forde than a pull stroke for the same amount of energy used. There is also considerable reduction in heat and wear to the cylinder. Therefore, the preferred embodiment is to use a long screw and a long cylinder and rod.

For a vehicle weighing 4000 pounds or less, the preferred embodiment is to use a 3½ horsepower electric DC motor and a 1½ inch to 2 inch bore cylinder, that will give 2 to 4 tons of force which is more than adequate in driving the vehicle either at low or high speed. In order to meet on board energy demands, a small size bore cylinder is necessary so that a large volume flow of fluid is not needed especially during high speed driving. This will reduce energy demands considerably. However, with the larger sized vehicle where considerable torque is required on startup, as with large truck and bus vehicles, a large bore cylinder is used. This also would require a pump giving greater volume, a larger battery pack and an electric motor having more horsepower were the vehicle to be driven at high speed. A 3¼ inch bore cylinder would give 9 tons of force and a 6 inch bore cylinder would give 16 tons of force. Using a screw gear in combination with the cylinder arrangement allows for great torque at low speed in moving heavy loads on startup and once the vehicle is moving at 30–40 miles per hour aned momentum has built up the torque is reduced and the screw gear with its high pitch and number of screw turns allows the horsepower and speed to be increased without over increasing the speed of the piston in the cylinder. For average high speed driving within the speed limit, the piston strokes should not exceed 180 strokes per minute. This is condsiderably lower than the number of strokes imparted in an internal combustion engine having a crank and shaft where the number of strokes is directly proportional to the number of turns of the output shaft. So with the screw engine there is less wear and heat developed which gives greater efficiency and also a reduction in engine maintenance and expense. This is also attributable to the need for one cylinder only.

FIG. 1, the rectangular gear plate 11A,11B,11C and 11D is adapted to the clutch plate 10A,10B,10C and 10D that are dual clutches and made of friction material or can be electromagnetic or interlocking but of the same design without the spring and throwout bearing as the standard vehicle clutch system. A single clutch element can also be used. The clutches and drive gears are positioned to each side of a rotatable hollow output shaft 25 having adapted thereto a pulley 15 and belt 39 for connection to FIG. 2A and FIG.2B, a pulley at the jackshaft 17B, and variable pulleys at the jackshaft 17B (as previously mentioned) are connected by belt to a pulley fixed to each wheel 35 axle having bearing and a connecting shaft between the two axles, permitting independent movement thereof.

FIG. 1, fixed to each end of the output shaft 25 is a geared 14A, 14B and counterbalanced 43A and 43B flywheel 13A and 13B that is rotated by clutch 10A and 10B in driving the output shaft. Also, a second flywheel 13C and 13D is positioned to each side of the output shaft 25 and is connected to the first flywheel 13A and 13B by a connecting arm 56A, 56B, 56C and 56D, that provides additional power to the output shaft when driven by clutches 10C and 10D that are connected by a rod 57A,57B,57G and 57H to rectangular gear plates 11C and 11D, causing the gears, clutches and flywheels to rotate simultaneous to the reciprocation of the worm screw gear 9A and 9B. Gears 14A, and 14B to the flywheel 13A and 13B can be connected to a smaller gear (not shown) that can be connected to a power takeoff shaft for driving an alternator or other device. Bearings 33A and 33B are axial and radial thrust type bearings that are connected to a stationary mount 41 for providing support to the output shaft 25.

FIG. 1, slidably adapted to the inside of the hollow output shaft 25 is a second hollow shaft 55A and 55B that extends through the entire length of the output shaft 25 and is connected to the inside of each of the two clutches 10A and 10B after passing through an opening to the center of the two flywheels 13A and 13B. The screw gear 9A and 9B reciprocate through the second hollow shaft 55A and 55B and also as this is a dual drive system a second set of hollow shafts 33C and 33D comprising a bearing, and through which the screw gear 9A and 9B reciprocates, is connected to flywheel 13C and 13D and to clutch 10C and 10D. The bearings connected to the clutches allow the clutches to rotate freely in either direction according to the reciprocation of the screw gear 9A and 9B.

FIG. 1, pushing screw gear 9A to rectangular gear 12A and 12B causes rotation to gear plate 11A and 11C that in turn rotates cluches 10A and 10C and simultaneously the push movement of the screw gear 9A exerts a force to the clutches that is in turn exerted against the flywheel 13A and 13C causing it to rotate. No pressure plate is needed as with the standard clutch with the internal combustion engine because the force of the reciprocatable screw gear holds the clutch against the flywheel.

FIG. 1, however, simultaneous to the movement of the screw gear 9A as described above, the rectangular gears 12C and 12D are driven away the from the flywheel 13B and 13D because the screw pitch is at a different angle and the inner hollow shaft 55A and 55B pulls the clutch 10B and 10D outward also, and the clutch rotates freely approximately 1/16th of an inch away from the flywheel. However, when screw gear 9B is reciprocated in the reverse direction the reverse action takes place and the flywheels 13B and 13D are rotated and the screw gear 9A pulls the rectangular gears 12A and 12B away from the flywheel 13A and 13C, so only one end of the output shaft is rotated at any one time. And having the screw gears 9A and 9B with a variable pitch permits one continuous direction of rotation to the output shaft 25 regardless of the direction of reciprocation of the screw gear 9A and 9B, each operative only to one end of the output shaft 25.

FIG. 2A, is a diagram of the compressed air recovery system and the compressed air auxiliary power system. At the front and rear axles of the vehicle is a compressor 7 connected means pulley and belt(not shown) that is engaged during vehicle deceleration and braking by a clutch mechanism (not shown but fully explained in FIG. 2C) for compressing air that is fed through pipeline 36A to electric solenoid valve 67D that is a flow direction al control valve for transmission of the compressed air to a storage tank 51 or through pipelines to a control valve 66 that is a six way directional flow valve for transmission of the compressed air to a screw engine generator comprising a screw engine as fully explained for FIG. 1 having its output shaft connected by belt to a pulley connected to an alternator 5A for generating electricity. Or the compressed air can be fed from the storage reservoir to a booster cylinder 32A and 32B for boosting the hydraulic fluid therein it can be transmitted through pipeline 36B to electric solenoid valve 67A for loading cylinder 1A. As previously explained in FIG. 2B compressed air can be transmitted through actuator valve 68 to electric solenoid valve 67B and air is exhausted through valves 67A and 67B. As explained in FIG. 2B for the hydraulic ststem, in FIG. 2A an accumulator can be connected to cylinder 1A by a clutch mechanism (not shown) adapted to rods 2C and 2D and to the accumulator and booster for boosting the pressure of the hydraulic fluid and this also could be adaptable to the compressed air system for driving the screw engine number 1 for driving the jackshaft 17B and axles of the wheels 35 of a vehicle.

FIG. 2A and FIG. 2B, shows the accumulator having reservoirs 52 for holding working fluid that is transmitted through valves to the accumulator when piston rods 2C and 2D drive the rods at each end of the accumulator connected to pistons therein in two separate chambers (not shown) for pressurizing hydraulic fluid that is fed to two separate chambers in the booster cylinder for driving piston rods connected to the screw engine number 1 ( as previously explained in FIG. 1).

Figure 2C:
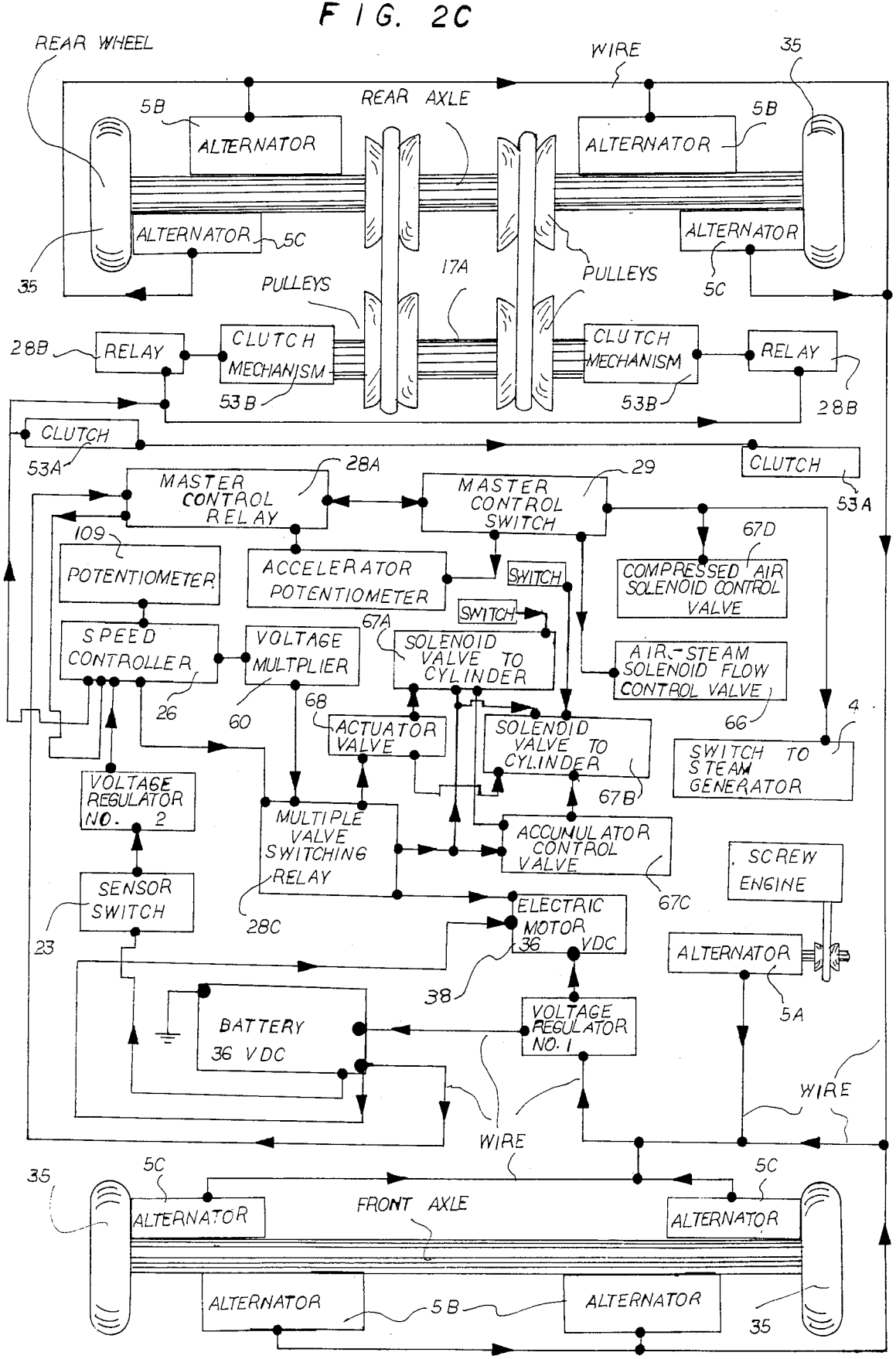
FIG. 2C is illustrative of the electrical control circuitry showing the complete electrical arrangement to the master control switch, the relays, switches, solenoid valves, potentiometers, the battery and electric motor and also the electrical switching for auxiliary electrical power
Figure 2D:
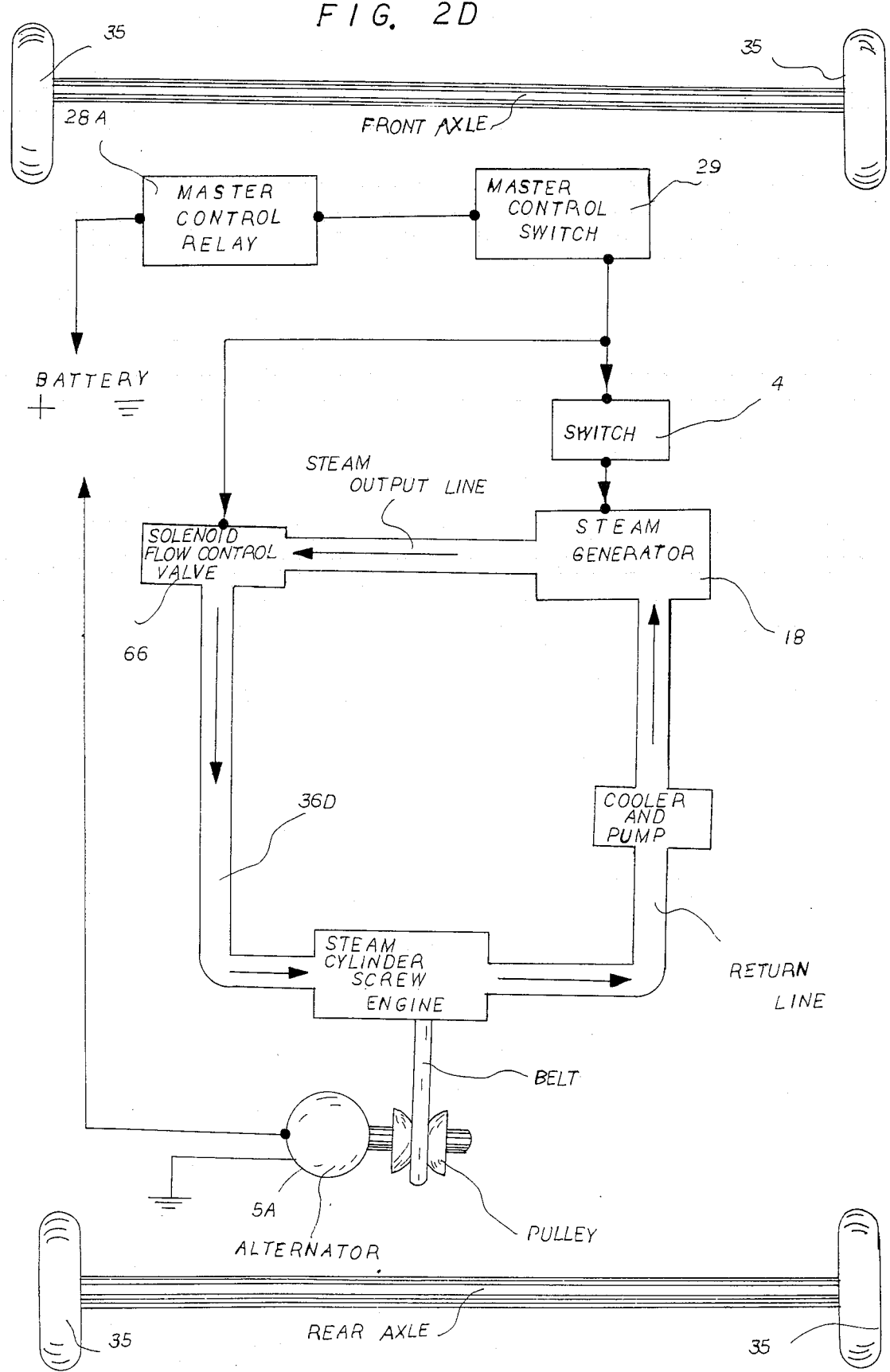
FIG. 2D is illustrative of the electrical switching control arrangement for operating the steam generator and the alternator for generating electricity

FIG. 2D shows the steam generator that can be fueled by solar heat from solar panels placed to the roof and external areas of the vehicle. The panels can be the rotatable type that can be adjusted for full sun exposure. (Solar panels and piping are not shown). Or other means for heating the steam generator would be the application of heating oils, fuel oils and chemicals (not shown). This drawing shows a battery source for providing electricity to a master control relay 28A wired to a master control switch (as explained in FIG. 2C) 29 that is operator controlled for energizing relay switch 4 for turning on the valve (not shown) and the fuel ignitor (not shown) for activating the steam generator 18 for generating steam that is low pressure and fed through an output line to a six way electric solenoid valve 66 that is a directional control valve and is wired to relay switch 4 for opening the steam side of the valve for transmission of low pressure steam through pipeline 36D to valves (not shown) at a steam cylinder for driving a screw engine ( as explained for FIG. 1) having an output shaft (not shown) connecting a belt to a pulley at the rotor shaft of an alternator 5A for generating electricity. The alternator is preferably of 90-100 Amperes and a combination of 12 VDC alternators arranged in series or a single alternator for giving an output of 36 volts direct current.

The steam generator would be applicable when the charge in the battery pack would reach a predetermined level that would be determined by the operator of the vehicle from visual contact to a ampere gauge (not shown) positioned to the operator's compartment of the vehicle. Normal low speed driving would not require the use of the steam generator, and it would be most applicable during high speed driving for passenger vehicles, during down time or for large trucks and buses.

FIG. 2C is illustrative of the electrical system for operating the hydraulics, the compressed air and the steam power system. It shows the alternators connected to the front and rear axles and wheels of a vehicle for generating electricity and in the same manner as previously described in FIG. 2A for compressing air during braking, deceleration and acceleration of a vehicle.

FIG. 2C, The electricity generated by alternators 5B and 5C is transmitted by wire to voltage regulator number 1 which regulates the voltage at 36 volts and the alternators are 36 volts at 90-100 amperes. Voltage is transmitted from the voltage regulator number 1 to a 36 volt battery pack or directly to the 36 volt electric motor depending upon the voltage level in the battery, and the electric motor can be operated directly from the electricity generated from the satellite alternators including alternator 5A whereby electricity is generated by either compressed air or steam auxiliary power as fully explained in FIG. 2A and 2D previously.

FIG. 2C, The operator controls the flow of compressed air as explained in FIG. 2A through master control switch 29,after receiving current through master control relay 28A, and through electric solenoid valve 67D that is the directional control valve for transmitting compressed air to tank 51 or directly to six way directional control vavle 66 for transmitting compressed air to the screw engine for driving alternator 5A in generating electricity. Solenoid valve 67D also controls the transmission of compressed air from air tank 51 to the booster cylinder as shown in FIG. 2A.

FIG. 2C, also, the operator controls the startup of the steam generator by energizing relay switch 4 that causes a valve (not shown) to release fuel (heating oil, fuel oil) to a fuel ignitor burner (not shown) that heats a series of coils (not shown) containing water or a fluid that can produce a low pressure steam for driving a steam cylinder to a screw engine generator as described in FIG. 2A. Electric relay switch to steam generator 4 is also the switch for opening the valve for release of a chemical for heating a liquid to low pressure steam or also it can be a solar generator for connecting a heatable liquid to solar heat and for generating steam in heating coils (not shown). Steam is transmitted through six way electric solenoid valve 66 through separate steam orifices to the screw engine for driving alternator 5A. Solenoid valve 66 is controlled by the operator through the master control switch 29 and there is a separate orifice for compressed air, and the predetermined arrangement is for either compressed air or steam to drive the screw engine to the alternator 5A but not both sources of energy simultaneously. (As previously explained for air).

FIG. 2C, as the preferred embodiment is for driving the vehicle with hydraulics using a 36 volt electric motor 38 for driving a multi-stage pump as shown in FIG. 2B, FIG. 2C, the pressurized fluid is fed to a pressure compensating and directional control valve 67C that is an electric solenoid valve receiving electric current from a multiple valve switching relay 28C that is a switching relay for solenoid valves at the FIG. 2B cylinder 1A and valves between the accumulator cylinder and booster cylinder, that serve as input and output valves at the cylinders, and a proximity switch is positioned at each end of the piston rods that receives current from switch 28C and that is also wired to switch 28C for switching on and off solenoid valves 67A and 67B and valves to the accumulator cylinder and the booster cylinder.

FIG. 2C, all valves operate at 24 volts direct current, the voltage is supplied from a voltage multiplier at the speed controller 26 that receives voltage from the battery through voltage regulator number 2 that is a multiple voltage regulator providing low voltage of 5 volts direct current, 24 volts direct current and 36 volts direct current. The 36 volts is fed through switching relay 28C to the electric motor and the 5 volts direct current is fed to master control relay 28A that is connected to the master control switch 29 operated by the operator of the vehicle.

FIG. 2C, actuator valve 68 that is positioned between solenoid valves 67A and 67B serves to FIG. 2B feed pressurized fluid back and forth between the cylinder valves and direct the flow of excess pressurized fluid back through either solenoid valve 67A or 67B to the accumulator through control valve 67C. FIG. 2C, the preferred embodiment is for pressurized fluid first to be fed to the FIG. 2B accumulator 30 through FIG. 2C accumulator control valve 67C then to valves 67A and 67B at the cylinders, though valve 67C is a pressure compensating valve and when the accumulator is full of pressurized fluid or there is not sufficient fluid available at the accumulator for loading the cylinder 1A, then pressurized fluid can be fed directly from the multistage pump (not shown in FIG. 2C but shown in FIG. 2B) to solenoid valves 67A and 67B for input to the cylinder 1A, this is especially during a high speed operation when the vehicle would be operating at full throttle and at its maximum consumption of energy. During stop and go driving as in congested traffic or inner city driving, normally the vehicle could be operated from pressurized fluid fed from the accumulator, and the vehicle could be operated for short distance from accumulated fluid only and the electric motor would be non operative with no use of electrical energy for driving the motor.

FIG. 2C, In order for the pressurized fluid to be automatically controlled by the operator of the vehicle, sliding potentiometers (not shown) are adapted to the accelerator pedal (not shown) so that its up and down movement causes the resistance element to the potentiometer to slide giving a preset and predetermined low voltage output of 5 VDC maximum in proportion to the induced voltage and resistance at the potentiometer(not shown). The low variable voltage is transmitted to master control relay 28A for transmission to speed controller switch 26 that comprises a potentiometer 109 and a voltage multiplier 60 for controlling the voltage transmitted from the master control relay 28A, the accelerator potentiometers and the voltage regulator number 2 and for transmitting either 36 volts to the electric motor or 24 volts to the electric solenoid valves.

Either one multiple resistance potentiometer (not shown) or three separate sliding potentiometers are adapted to the accelerator pedal (not shown) with each potentiometer (not shown) providing a low variable voltage. FIG. 2C, the first accelerator potentiometer (not shown) provides a variable voltage for controlling in degrees the opening and closing of electric solenoid valves 67A and 67B to the FIG. 2B cylinder 1A that controls the volume flow of fluid that controls the speed of the piston(not shown) in moving the non rotatable screw gear through its connection to the piston rod. In this manner the first potentiometer serves as a speed control element when the variable voltage is transmitted to the speed controller 26 where through select switching contacts the low voltage current is increased to 24 volts as voltage is transmitted from the battery through FIG. 2C, multiple voltage regulator number 2. Potentiometer 109 that has variable resistance and has the potential for 24 volts retransmits a high voltage current of 24 volts proportionately in the same variable degrees as induced at the accelerator potentiometer to the electric solenoid valves 67A and 67B after first passing through select switching contacts at multiple switching relay 28C having switching contacts also connected to a switch positioned at each end of the piston rods that switch on and off according to the preset and predetermined position of each piston rod. In this manner the multiple valve switching relay 28C controls the opening and closing of solenoid valves 67A and 67B so that either pressurized fluid is fed to the cylinder in degrees or FIG. 2B, exhausted and spent fluid is returned to the reservoir through actuator valve 68 that is also FIG. 2C wired to select switching contacts at multiple switching relay 28C and wired to switching contacts to electric solenoid valves 67A and 67B for simultaneous opening and closing. Actuator valve 68 is also 24 volts and is positioned between solenoid valves 67A and 67B and also serves as a holding valve for pressurized fluid so that working fluid is also immediately available to the cylinders and so that there is no line drop in pressurized fluid between the accumulator, pump and cylinder.

The voltage multiplier 60 comprises a high capitance condenser and a series of diodes arranged for holdng and accumulating voltage for transmission to the multiple switching relay 28C, as the voltage is received from the battery and through voltage regulator number 2 and through switching contacts at the speed controller switch 26.

FIG. 2C, a second sliding potentiometer adapted to the accelerator pedal (not shown) also receives an input voltage of 5 volts from the master control relay 28A and provides a variable voltage output to the master control relay 28A proportionate to the voltage induced by the resistance to the potentiometer caused by the movement of the accelerator pedal (not shown) by the operator of the vehicle. The induced variable voltage is fed to three separate select switching contacts, each contact for a separate low induced voltage, at the speed controller 26 for transmission of 24 volts to three separate switching contacts at multiple relay 28C each contact being separately wired to a select switching contact at a select pressure orifice,as predetermined at the accelerator potentiometer, to accumulator control valve 67C for controlling the flow of pressurized fluid to and from FIG. 2B accumulator 30 and from the multistage pump at the electric motor.

FIG. 2C, accumulator control valve 67C is an electric solenoid and pressure compensating valve having preset and predetermined pressure settings according to the weight and maximum vehicular speed as determined by the bore diameter and length of cylinder, the diameter of pipelines to and from the accumulator and pump and the pressure and volume output of the pump at predetermined revolutions per minute. Select switching controls at the accumulator control valve are energized for opening and closing a series of orifices therein according to the acceleration speed at the accelerator pedal (not shown) and the proportionate induced voltage fed to the accumulator control valve with each switching contact at the valve indicative of a predetermined pressure that opens or closes a select orifice according to the applied voltage. FIG. 2B, as the accumulator control valve 67C is connected to the accumulator 30 and the multistage pump, pressurized fluid is controlled through this valve as output to solenoid valves 67A and 67B at the cylinder 1A.

FIG. 2B and FIG. 2C, when the pressure at the pump and the accumulator is equalized, through visual observation to a gauge in the operator's compartment of the vehicle, select switching contacts at the master control switch 29 can deenergize the switching coil at speed controller switch 26 that is the switching control for 36 volts transmitted from the battery through voltage regulator number 2 providing current to the electric motor. Simultaneously the switching coil for the electric motor at multiple switching relay 28C is also deenergized. When the power to the electric motor is deenergized, the vehicle can be operated from pressurized fluid at the accumulator 30, as the orifice to accumulator control valve 67C is opened under pressure contained therein for release to solenoid valves 67A and 67B.

FIG. 2B and FIG. 2C, when the pressure at the orifice to the pump side of solenoid valve 67C is greater than the pressure at the orifice to the accumulator, pressurized fluid is fed to the accumulator 30 and also to solenoid valves 67A and 67B until the accumulator 30 is filled full of pressurized fluid. However, this is applicable for a predetermined vehicular speed and the preferred embodiment is for the accumulator 30 and the valves 67A and 67B to be supplied with pressurized fluid simultaneously for vehiculator speeds under 65 miles per hour (this is determined by the number of piston strokes and the gallons of fluid used per minute) and for higher speeds both the pump and the accumulative reserve would be used by select switching at valve 67C for opening of both orifices caused by the depression of the accelerator pedal (not shown) and a 5 volt release of voltage through the accelerator potentiometer transmitted to select switching contacts at the speed controller 26, relay 28C and the accumulator control valve 67C.

Using a standard multi-stage pump (common to industry) having flow control valves for directing the flow of fluid from a reservoir to the pump area of low volume and high pressure, high pressure and high volume and low pressure and high volume, by electrically connecting the flow control valve from the pump to the accumulator control valve at a predetermined and prearranged orifice coinciding with variable voltage arrangement to the second sliding potentiometer at the accelerator pedal (not shown) the flow control valve at the pump is also controlled by the accumulator control valve 67C and the accelerator potentiometer for predetermined control and regulation of fluid flow to the accumulator 30 and valves 67A and 67B at cylinder 1A.

FIG. 2C, the third accelerator potentiometer adapted to the accelerator pedal (not shown) regulates and contrls the electric solenoid operated clutch mechanism 53B through switching relay 28B that are operatively connected to the jackshaft 17A for engaging the pulleys during vehicle acceleration and for disengaging the pulleys during vehicular deceleration and braking. FIG. 1, although the output shaft 25 to the screw engine 110 can rotate freely during braking or deceleration of the vehicle, providing no fluid pressure is present in the cylinder and a relief valve (not shown) can release this pressure by being electrically wired to FIG. 2A relay 28B for operation in conjunction with the clutch mechanism 53B. Simultaneously, clutch mechanisms (not shown) are adapted for engaging and disengaging alternators 5B to the front and rear axles. Alternators 5B are engaged for rotation and generating electricity at the axles when the clutch mechanisms disengage the pulleys at the jackshaft 17A so that the pulleys are not rotated by the rotating pulleys fixed to the front and rear axles.

FIG. 2C, additionally, clutch mechanisms 53A are also wired to relay 28B that is wired to speed controller 26 where it receives 24 volts after transmission of a low voltage current (as previously explained) from the accelerator potentiometer at the accelerator pedal (not shown). The clutch mechanisms 53A and 53B can both be controlled automatically through relay 28A or manually through relay 28A and the master control switch 29 when arranged by the operator of the vehicle. Normally, clutch mechanism 53A, that is arranged between the FIG. 2A piston rods at cylinder 1A and the accumulator and booster cylinders for connecting these elements so that they can operate as one unit in driving the non rotatable screw gear, is manually controlled by the operator and the screw gear would normally be driven by the drive cylinder 1A only. FIG. 2C, releasing the accelerator pedal (not shown) during normal driving would automatically deenergize the contacts at relay 28B causing the coil to drop out and release the clutch mechanism from engagement to the pulley and shaft 17A and simultaneously the switching contacts at relay 28B would be energized for engagement of the clutch mechanism (not shown) to the alternators 5B at the axles of the vehicle for engaging a belt and pulley (not shown) for generating electricity.

Figure 3:
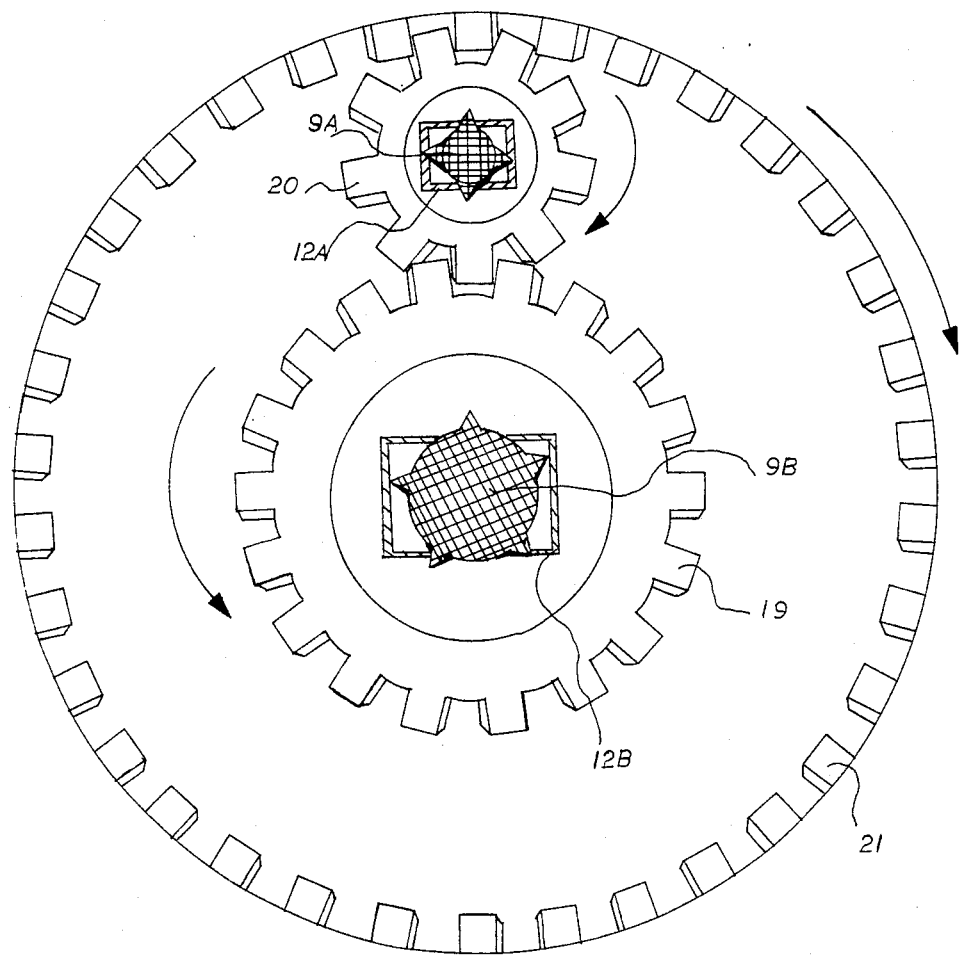
FIG. 3 is a diagram showing the arrangement for compound gearing to the clutch drive plate, including multiple rectangular gears

Illustrative in FIG. 3 is a method for applying compound gearing for driving anoutput shaft as shown in FIG. 1 to an arrangement of multiple FIG. 3 screw gears 9A and 9B, each arranged for slidable engagement to a rectangular gear 12A and 1B comprising a rectangular opening inside a metal plate (as previously explained) that is fixed to a planetary gear 20 that is arranged for engagement to an inner ring gear 21 and both gears being driving simultaneously by and to a sun gear 19. Screw gears 9A and 9B are synchronized to operate with a unified force when driven by a piston rod (not shown) in FIG. 3 but shown in FIG. 1.

Figure 3A:
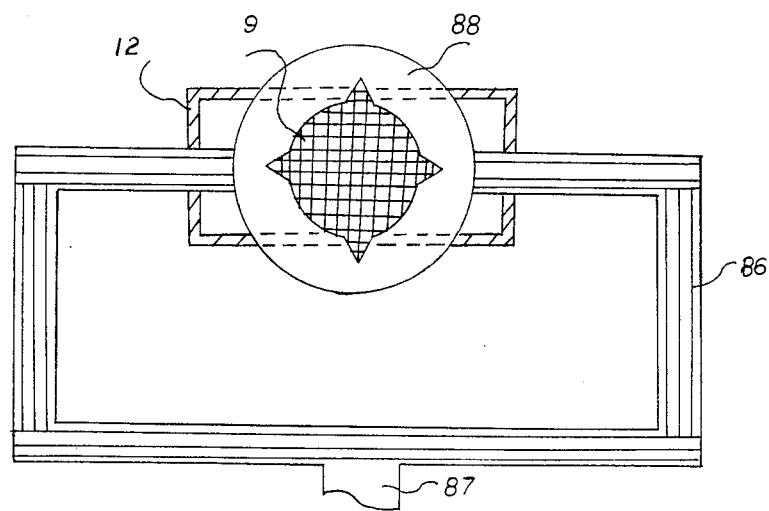
FIG. 3A is illustrative of a rectangular gear adapted to a throw-out bearing and shaft for selectively engaging or disengaging the rectangular gear from making contact to the worm screw gear

FIG. 3A is illustrative to FIG. 1 for selectively engaging and disengaging the rectangular gear 12 to the screw gear 9 by having a variable clutch mechanism 86 adapted to the rectangular gear 12 and a throwout bearing 88 that would release the rectangular gear 12 by separating it and allowing enough space for the screw gear 9 to slide through it without making contact when a movable arm 87 is pushed into a release position to the variable clutch mechanism 86 that can be controlled by the operator of the vehicle through selective electrical switching at the master control switch 29 to an electric clutch mechanism (not shown) operatively connected to the variable clutch mechanism 86, or a manual connection can be made to the movement of the piston rod for engagement and disengagement during a push or pull movement.

FIG. 4, is illustrative of a gravitational generator 5B that is shown in FIG. 2C adapted to the wheels and axles of a vehicle. FIG. 4, in this drawing it is shown the same screw drive arrangement as explained for FIG. 1, with a screw gear 9A having a left hand pitch and the other end of the screw gear 9B having a right hand pitch with each end of the screw gear connected to a spring 40A and 40B that is adapted to a stationary mount 41A and 41B with one stationary mount being connected to the axle of a vehicle and the other end of the stationary mount connected to the frame, chassis of a vehicle (not shown). FIG. 4, an alternator 5B having a hollow rotor shaft 47 through which the screw gear 9A and 9B can reciprocate when driven by the up and down movement between the axle and vehicle chassis.

FIG. 4, the rotor 47 is operatively connected to the stator 46, as with any standard alternator, for generating electricity that is fed by wire to a battery for storage. The outside casing to the stator 46 is connected to the chassis/frame of a vehicle by stationary mounts 41C and 41D, or the stator 46 can be arranged to rotate freely by not connecting the sttionary mounts 41C and 41D and in this case the weights 43A and 43B counterbalance the movement of the alternator 5B. As shown in FIG. 1, and in FIG. 4, a rectangular gear 12A and 12B are positioned at each end of the alternator and comprise an opening in a plate that is proportionate to the screw gear 9A and 9B, the plate 11A is connected by an arm 57A and 57C and plate 11B is connected by an arm 57B and 57D to a clutch 10A and 10B that is positioned to be driven against or away from a flywheel 54A and 54B fixed to each end of the alternator and rotor shaft 47 for driving the rotor 47 in a rotating motion to the stator 46. FIG. 4, FIG. 1, adapted inside the rotor shaft 47 is a second hollow shaft 55A and 55B that extends through the entire length of the rotor shaft 47 and through an opening in the center of the flywheels 54A and 54B and connects at each end to a bearing 33A and 33B that is adapted to each clutch 10A and 10B providing free rotation thereof so that either during a push or a pull movement to the screw gear the clutch will either engage or disengage to the flywheels 54A and 54B. Depending upon the terrain and driving conditions of the vehicle, the gravitational generator should normally generate 30 amperes of current at 36 volts.

Figure 5:
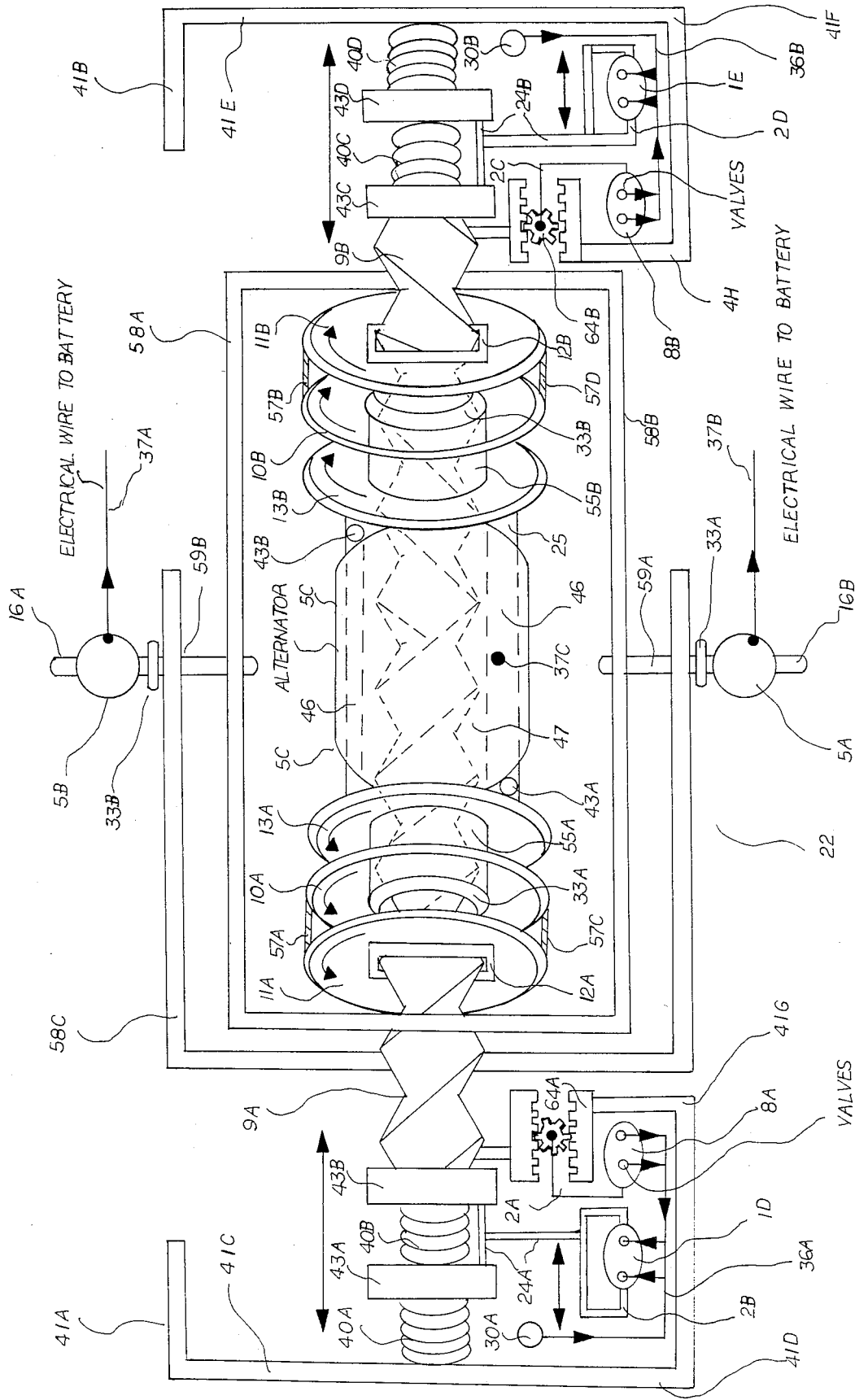
FIG. 5 is illustrative of a gyroscopic generator in which the alternator is mounted to a trunnion and the rotor having a hollow shaft through which a variable pitch screw gear can reciprocate for rotating the rotor during vehicular movement in working relationship to springs, weights and pumps for driving the screw gear

FIG. 5, is a drawing of a gyroscopic generator comprising an alternator 5C, 5B and 5A, that are operative to a screw drive as explained in FIG. 1 having a flywheel 13A and 13B fixed to each end of a hollow rotor shaft 47 that is operatively connected to a stator 46, the rotor shaft serving as an output shaft. The screw gear 9A and 9B having a right hand pitch and a left hand pitch at either end of the alternator 5C and the arrangement is the same as for FIG. 4 as explained previously and for FIG. 1, with the rectangular gears 12A and 12B being an opening in the center of a drive plate 11A and 11B connected by arms 57A,57C,57B and 57D to clutches 10A and 10B that are freely rotatable to flywheels 13A and 13B that are fixed to each end of a hollow rotor 47 that is operatively connected to the stator 46 for generating electricity when the rotor 47 is driven by the flywheel, either 13A or 13B. Generated electricity is fed through wire 37C to a storage battery (not shown). The alternator 5C is connected to frame 58A and 58B that swings freely to trunion 59B and 59A that is connected to a second frame 58C. The trunion 59B and 59A also swings freely to frame 58C and 58A and 58B means a bearing 33A and 33B adapted between each frame and to a shaft 16A and 16B that serves as a rotor to an alternator 5A and 5B for generating electricity as the shaft 16A and 16B is rotated during movement of the screw gear 9A and 9B to the Alternator 5C.

FIG. 5, the arrangement is for a gyroscopic action in driving the screw gear 9A and 9B by connecting a frame stationary mount 41A,41C 41D 41G,41E,41B,41F and 41H to the undercarriage of a vehicle, preferably to its center, so that any vehicular movement will cause movement of the screw gear 9A and 9B in driving the rotor 47 to the stator 46. At each end of the screw gear 9A and 9B is a spring 40A and 40D connected to frame 41C and 41E on one end and slidably connected to a weight 43A and 43D and between this weight is a second spring 40B and 40C having a weight 43B and 43C to its other end and slidably mounted to the screw gear 9A and 9B. Any movement of the frame 58C and 58A and 58B to the trunion 59A and 59B will cause the weights 43A,43B,43C and 43D to move against the springs 40A,40B, 40C and 40D thus giving a reciprocatable movement to the screw gear 9A and 9B. As the weights and springs are mounted to a shaft at each end of the screw gear weights 43B and 43C no movement is possible beyond the screw pitch. However, in order to give an added force to this reciprocatable movement, a rack and pinion gear 64A and 64B is fixed to each end of the screw gear 9A and 9B at its pitch and to weights 43B and 43C, a second rack gear is connected to stationary mounts 41G and 41H and the pinion gear is connected to a piston rod 2A that is connected to a hydraulic cylinder 8A and 8B and when loaded with pressurized fluid the piston rods 2A and 2B drive the rack and pinion 64A,64B that in turn reciprocatably drive screw gear 9A and 9B in rotating the rectangular gears 12A and 12B for driving clutches 10A and 10B for rotating the flywheels 13A and 13B in rotating the rotor 47 to the stator in generating electricity.

FIG. 5, the hydraulic cylinders 8A and 8B are loaded by a pump 1D and 1E that receives hydraulic fluid from a storage reservoir accumulator 30A and 30B and the pressurized fluid is transmitted through lines 36A and 36B to the pump and cylinder. The pump 1D and 1E has manual operated valves mechanically connected to the piston rods 2B and 2D that are connected to a control arm 24A and 24B extending to and between the two weights 43A and 43B at one end of the screw gear 9A or 9B and at the other end between weights 43C and 43D and any movement of the weights causes the piston (not shown) inside the cylinder pump 1D and 1E to pressurize fluid for transmission to either cylinder 8A or cylinder 8B each arranged for a separate predetermined and different operating pressure so that the cylinders cannot operate simultaneously at the same push or pull force.

Figure 6:
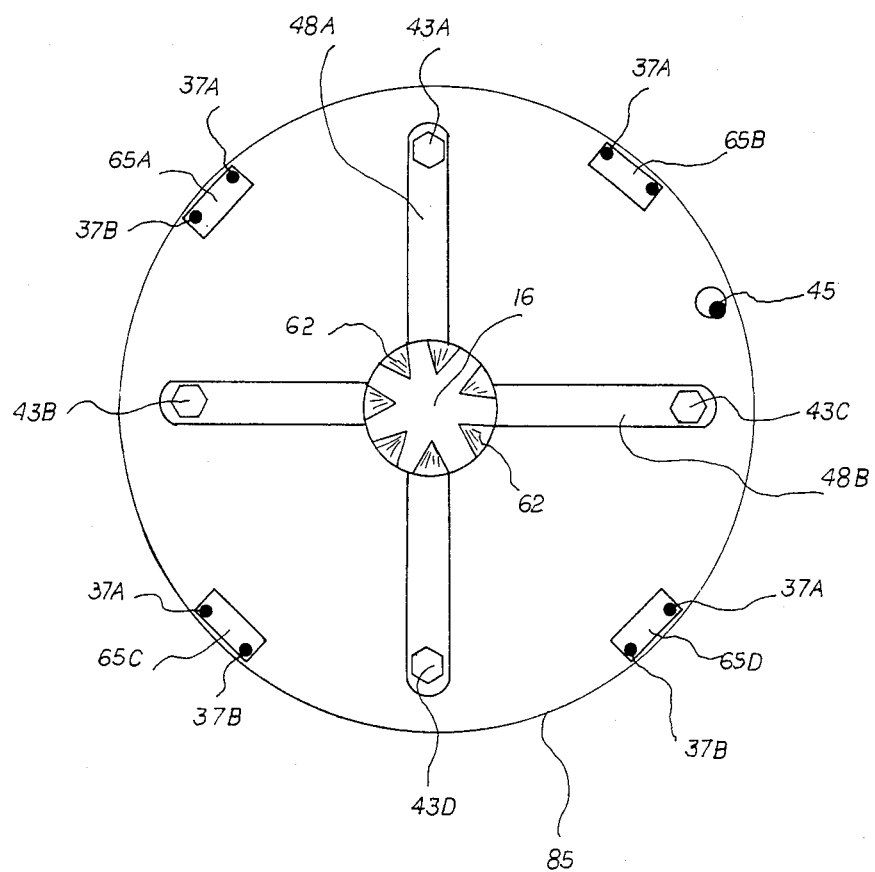
FIG. 6 is illustrative of a wind generator adapted to operate electromagnetically, having a series of electromagnets fixed to the rim of a shroud and that make contact to a series of metal weights fixed to the ends of a plurality of rotatable blades adapted to a spiral gear shaft, the electromagnets being energized through a sensing switch connected to a battery. This drawing is also in combination with FIG. 7
Figure 7:
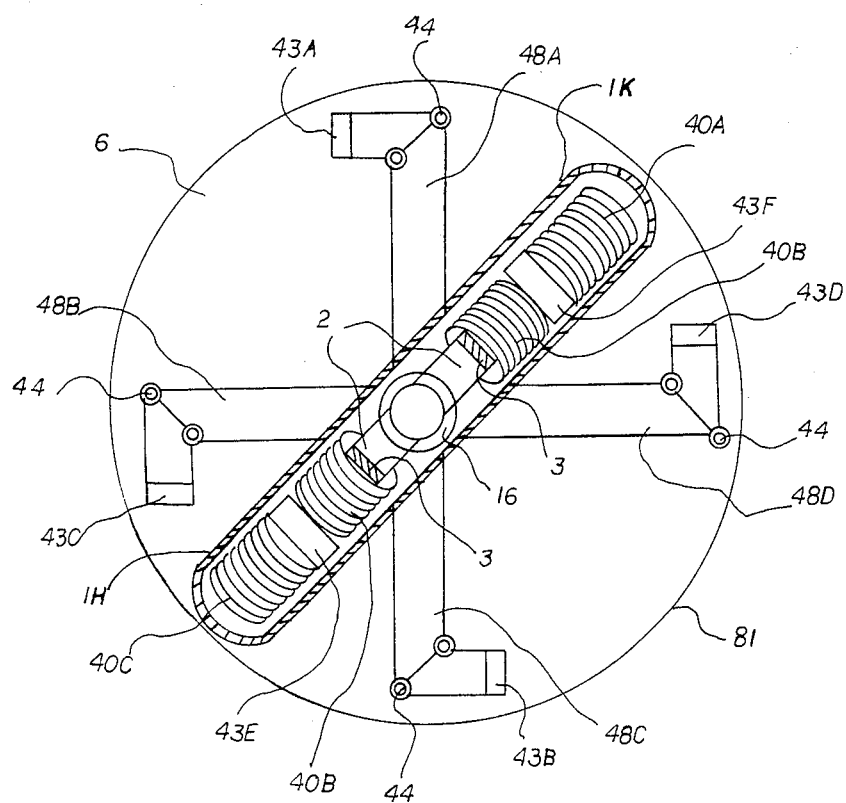
FIG. 7 is illustrative of a wind generator having multiple blades with movable weights adapted to the ends for rotating the baldes adapted to the same shaft as described in FIG. 6, the shaft having adapted to it a cylinder having a piston with springs on one end and the other end having a weight connected to a piston rod with springs on either side, compressed air or pressurized hydraulic fluid is fed from a storage tank to the cylinder operatively engaging the piston and rod to the weight and springs in rotating the shaft and blades

FIG. 6, the preferred embodiment is for FIG. 6 and FIG. 7 elements to be operatively connected together, although either can be operated separately. FIG. 6 shows generator blades 48A and 48B with each blade having a metal weight 43A,43B,43C and 43D at its end for making contact to a series of electromagnets 65A, 65B,65C and 65D that are wired through wires 37A and 37B to FIG. 2C electric sensor switch that switches on and off and provides 36 volts from a storage battery. FIG. 6, a shroud and casing 85 encloses the blades and directs the air to its center, and the shoud 85 is fixed to the front frame or chassis of a vehicle so that the air will turn the blades as the vehicle is moving with the electromagnets keeping the blades turning regardless of the wind velocity and the blades can also rotate and generate electricity even while the vehicle is standing still when the electromagnets are energized by the sensor switch. The four blades are connected to a hollow shaft 16 having to its inner circumference a series of spiral gears 62 aligned for engagement to FIG. 7, a second shaft 16 having matching spiral gears that inner connect to blades 48A,48B,48C and 48D causing both shafts to rotate simultaneously in rotating the blades and a generator(not shown) attached to the shaft 16 in generating electricity.

FIG. 7, is illustrative of the arrangement of the wind generator as combined with that of FIG.6, adapted to the same shaft 16 whereby an air or hydraulic cylinder 1H and 1K is adapted also thereto and having a piston and rod 2 extending through the entire length of the cylinder 1H and 1K with its length extending the full length of the blades 48A,48B,48C, and 48D. Positioned to the piston rod 2 and to each side of shaft 16 is a piston 3 which is connected to a first spring 40B with a weight 43E and 43F slidably adapted to piston rod 2 and connecting a second spring 40A and 40C that extends to the end of the cylinder 1H and 1K. Compressed air or hydraulic fluid FIG. 2A, FIG. 2B, can be fed either from storage tank 51 for compressed air or from accumulator 30, FIG. 7, to the cylinder 1H and 1K for operatively engaging the piston 3 and rod 2 thereby causing a reciprocating movement to the springs 40B that exerts a force to weights 43E and 43F, that in turn exert a force against springs 40A and 40C that rebound from the end of the cylinder to reverse the force causing a constant reciprocatable movement to the shaft 6 that drives the spiral gears 62 in rotating blades 48A,48B,48C and 48D that in turn rotate the armature or rotor (not shown) to a generator (not shown) connected to shaft 16 for generating electricity. The wind generator combination as shown in FIG. 6 and FIG. 7, should produce a steady 10 amperes of current at 36 volts at slow vehiclular speed or when the vehicle is standing still and up to 30 amperes of current at high speed driving of the vehicle. The advantage of this type of wind generator arrangement is its ability for high speed turning of the rotor and it also can be operative when the vehicle is non operative with little loss in current from the battery, as once the momentum to the blades and shaft is developed it can be continuously operative with less expenditure of energy.

Figure 8:
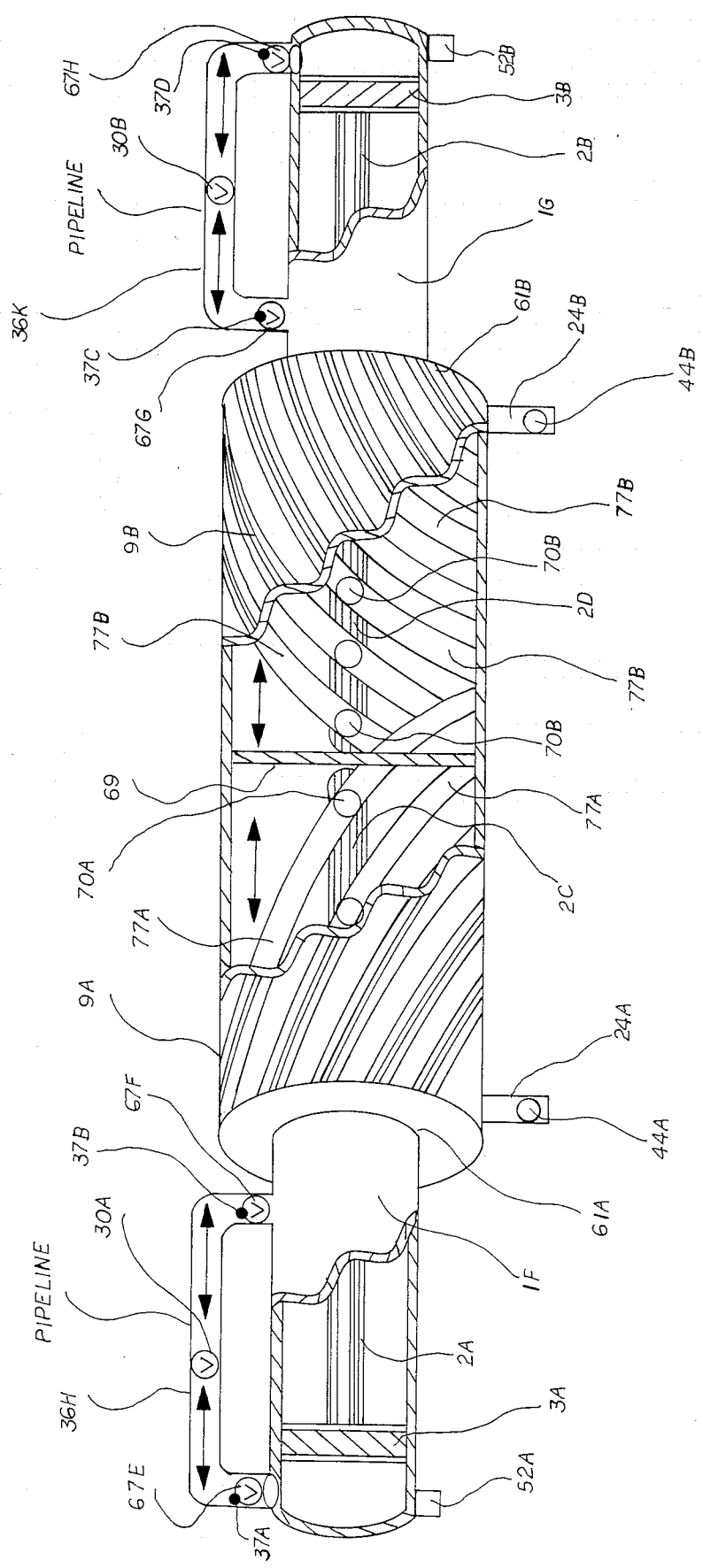
FIG. 8 is illustrative of a non rotatable hollow worm screw gear showing the inside of its hollow shaft and its connection at each end to a hydraulic or air cylinder with a piston rod extending inside the hollow shaft for making connection to a series of bolts arranged for fixed connection to each screw and extending through the outer surface wall to inside of the screw for either extending or contracting the screw pitch in minute degrees as compressed or pressurized hydraulic fluid is fed to the cylinders, the piston rod moving the bolt through a slot in the outer wall of the worm screw gear

FIG. 8, FIG. 2A, FIG. 2B and FIG. 2C and FIG. 1, the worm screw gear 9A and 9B can have a continuous hollow shaft 61A and 61B throughout its entire length having a separate piston 3A and 3B and rod 2A and 2B extending from each end of the worm screw gear 9A and 9B to a partition 69 that separates the two operative pistons 2A and 2B and provides support to the worm screw gear 9A and 9B. The outside casing of the cylinders 1F and 1G containing the piston 3A and 3B and rod 2A and 2B are fixed to the worm screw gear 9A and 9B and each has a common pipeline 36H and 36K connecting an electric solenoid input valve 30A and 30B for receiving pressurized fluid from a FIG. 2A and FIG. 2B, compressed air tank 51 or an accumulator 30. (pipelines not shown). FIG. 8, the pressurized working fluid is transmitted through electric solenoid valves 67E, 67F, 67G and 67H for input and output to cylinders 1F and 1G that also receives additional fluid from storage reservoirs and accumulators 52A and 52B adapted to pipelines 36H and 36K connected to the outside of cylinder 1F and 1G, where fluid can be stored under pressure as received from an outside source.

FIG. 8, the piston rods 2A and 2B extend inside the hollow shaft and are connected to a series of bolts 70A and 70B arranged for fixed connection to each screw 77A and 77B that extends through the outer surface of the screw wall to the inside of the screw for either contracting or extending the screw 77A and 77B in minute controlled degrees according to whether the reciprocating movement of the worm screw gears 9A and 9B as moved by control arms 24A and 24B for either high speed or low speed rotation to the output shaft 25. The movement to the rod 2C and 2D can be a fraction of an inch or to the maximum angle of pitch to the screw that would be possible and still make engagement to the FIG. 1, rectangular gear 12A and 12B without causing it to jam or lockup. Also, it would depend upon the diameter of the worm screw gear 9A and 9B as to the number of screw turns permissible and the maximum angle of pitch, and a small screw gear would allow for more screw turns than a large diameter screw gear. FIG. 8, having an adjustable screw pitch would be most applicable for driving large size vehicles such as trucks or buses.

FIG. 9, is illustrative of a second type of wind generator 6 that is positioned horizontally to the undercarriage (not shown) of a vehicle and preferably to its center. The wind generator 6 has air scoops 79 running from the rear axle 34 and wheels 35 to the front axle 34 and wheels 35 and air scoops 79 are also located to each side of the undercarriage to the vehicle. Shown in FIG. 9 is a top view showing the housing 81 that is mounted to the axles 34 and that has mounted to its interior reaction blades 82 extending from the entrance to the air scoops 79 to at least two gates 80 that are spring loaded (not shown) and that open and close for either permitting air to enter or blocking it off to a series of reaction baldes 82 to the interior of the circular part of the housing 81 which contains a shaft and an alternator 5 having wiring 37 for connection to FIG. 2C electrical input wire to voltage regular number 1 and to battery for storage. FIG. 9, the alternator 5 is connected to the output shaft 25 having a series of rotatable blades 48 with a weight adapted to the end of each blade 48 for providing counterbalance and momentum to the moving blade 48. The wind generator 6 is basically operational during vehicular movement, however, it can operate while the vehicle is standing still, providing the wind conditions are strong enough. The wind is carried through the air scoops 79 to the reaction blades 82 that cause a whirl effect that increases its speed for opening the gates 80 to a series of turbine blades 78 that are operatively connected to the output shaft 25 and in complete circumference to the blades 48. The incoming wind drives the turbine blades 78 and the reactionary force of the wind to the turbine blades 78 drive the output shaft 25 in combination to the force of the wind against the blades 48. And gates 80, that serve as valves to the input and output of air, can be arranged to be regulated by the operator of the vehicle by manual connection (not shown), which would give the ability to close off the availability of air to the turbine blades 78 during certain driving conditions. This wind generator 6 should generate a steady 10 amperes of current during normal driving conditions. Electricity can be generated regardless of the direction the wind approaches the vehicle.

The preferred embodiment to this invention for driving large size vehicles as trucks and buses is the application of a large bore cylinder for low speed driving and a small bore cylinder for speeds above 40 miles per hour, as once the momentum has been achieved less volume of fluid can be used.

The invention claimed is:

1. A power system for a vehicle comprising: a battery source for driving a DC electric motor mechanically coupled to a fluid pump which pressurizes a fluid for actuating a fluid motor that is operatively connected to reciprocate a worm screw gear assembly which rotates an output shaft connected to axles which drive the wheels of a vehicle, an auxiliary power device for operating an alternator to generate electricity and means for recovering kinetic energy; wherein said auxiliary power device includes means for supplying compressed air or steam to an air or steam motor which is operatively connected to a second worm screw gear assembly which drives an output shaft connected to said alternator for generating electricity, and wherein said kinetic energy recovery means includes an air pump connected between the axles and frame of the vehicle chassis so that vehicular movement actuates said air pump for compressing air for storage and also a worm screw gear driven alternator assembly connected between the axle and frame of the vehicle chassis for generating electricity during vehicular movement.

2. A power system according to claim 1, wherein said fluid pump is a multistage fluid pump and said worm screws gear assembly comprises a reciprocating worm screw gear which passes through and imparts rotation to at least two separate gears having either a rectangular or square central opening, a clutch mechanism attached to each gear which transmits the gear's rotation to a flywheel, said flywheels being attached at opposite ends of said output shaft.

3. A power system according to claim 1, wherein said worm screw gear alternator assembly comprises at least one alternator having a hollow rotor arranged for operative connection to a worm screw gear, a stator enclosed in a casing with said hollow rotor shaft, said hollow rotor shaft serving as an output shaft to a worm screw gear operatively connected thereto, a flywheel plate fixed to each end of said hollow rotor shaft, said flywheel plate having a center opening the same diameter as the diameter of the hollow rotor shaft, a second hollow shaft mounted within said hollow rotor shaft and extending the entire length of said hollow rotor shaft and having a bearing connected at each end for connection to a center opening to a freely rotatable clutch assembly, each of said clutch assemblies has a clutch plate having a rectangular shaped opening to its center proportionate to the shape of the worm screw gear shaft and for engagement through the thereto providing rotation to said clutch assembly, said worm screw gear having threads of a right hand pitch at one end and a left hand pitch at the other end joined together at the center providing for one continuous direction of rotation to said clutch assemblies, said flywheels and said hollow rotor shaft when said worm screw gear is driven reciprocatably and rectilinearly through said rectangular shaped opening and through said second hollow shaft, both ends of said worm screw gear are attached to spring mounts, one end rigidly fixed to the axle of said vehicle and the other end passing through an opening in the body of said vehicle, said alternator casing is fixed to the body of said vehicle so that reciprocation of said worm screw gear due to vertical movement of the axle of said vehicle causes said rotor to rotate in said stator and generate electricity.

* * * * *